US011375071B2

(12) United States Patent
Minami

(10) Patent No.: US 11,375,071 B2
(45) Date of Patent: Jun. 28, 2022

(54) SPEECH SETTING SYSTEM, NON-TRANSITORY COMPUTER-READABLE RECORDING MEDIUM HAVING SPEECH SETTING ASSISTANCE PROGRAM STORED THEREON, AND SPEECH SETTING ASSISTANCE DEVICE

(71) Applicant: KONICA MINOLTA, INC., Tokyo (JP)

(72) Inventor: Keita Minami, Amagasaki (JP)

(73) Assignee: KONICA MINOLTA, INC., Tokyo (JP)

( * ) Notice: Subject to any disclaimer, the term of this patent is extended or adjusted under 35 U.S.C. 154(b) by 104 days.

(21) Appl. No.: 17/009,148

(22) Filed: Sep. 1, 2020

(65) Prior Publication Data

US 2021/0099587 A1 Apr. 1, 2021

(30) Foreign Application Priority Data

Sep. 27, 2019 (JP) .............................. JP2019-177406

(51) Int. Cl.
*H04N 1/403* (2006.01)
*H04N 1/00* (2006.01)
(Continued)

(52) U.S. Cl.
CPC ....... *H04N 1/00403* (2013.01); *G06F 3/1296* (2013.01); *G06F 3/167* (2013.01);
(Continued)

(58) Field of Classification Search
CPC ............................ H04N 1/00403; G10L 15/22
See application file for complete search history.

(56) References Cited

U.S. PATENT DOCUMENTS

2019/0349488 A1* 11/2019 Chitpasong ........ H04N 1/00488
2020/0151526 A1* 5/2020 Natori ................... G06F 3/1204

FOREIGN PATENT DOCUMENTS

JP H09115107 A 5/1997
JP 2003108182 A 4/2003
(Continued)

*Primary Examiner* — Ibrahim Siddo
(74) *Attorney, Agent, or Firm* — Holtz, Holtz & Volek PC

(57) ABSTRACT

A speech setting system includes a job execution device that is capable of executing a job, and a speech setting assistance device that assists generation of the job to be executed by the job execution device based on speech information obtained from a speech, wherein the job execution device includes a first hardware processor, the first hardware processor is configured to execute the job in accordance with a parameter set for each of a plurality of setting items, and display a setting screen in which a plurality of the parameters respectively corresponding to the plurality of setting items are arranged, the speech setting assistance device includes a second hardware processor, and the second hardware processor is configured to determine the parameter corresponding to each of the plurality of setting items based on the speech information, and output speech output information for outputting the determined parameter corresponding to each of the plurality of setting items by speech in accordance with an output order that is defined based on a relative positional relationship among the plurality of the parameters arranged in the setting screen.

24 Claims, 14 Drawing Sheets

(51) Int. Cl.
*G06F 3/16* (2006.01)
*G10L 15/22* (2006.01)
*G06F 3/12* (2006.01)
*G10L 13/00* (2006.01)
*G10L 15/30* (2013.01)

(52) U.S. Cl.
CPC .............. *G10L 13/00* (2013.01); *G10L 15/22* (2013.01); *G10L 15/30* (2013.01); *G10L 2015/223* (2013.01)

(56) References Cited

FOREIGN PATENT DOCUMENTS

| | | |
|---|---|---|
| JP | 2004077601 A | 3/2004 |
| JP | 2013182171 A | 9/2013 |

* cited by examiner

FIG. 5

| JOB TYPE | SETTING ITEMS | PARAMETERS |
|---|---|---|
| COPY | COLOR | BLACK & WHITE/AUTO COLOR/FULL COLOR |
| | SCAN-PRINT | DUPLEX-SCAN DUPLEX-PRINT/ SIMPLEX-SCAN DUPLEX-PRINT/ DUPLEX-SCAN SIMPLEX-PRINT/ SIMPLEX-SCAN SIMPLEX-PRINT |
| | NUMBER OF COPIES | 1,2,3··· (NUMERALS) |
| | TWO PAGES PER SHEET | ON/OFF |
| SCAN | RESOLUTION | 300dpi/400dpi/600dpi |
| | DESTINATION | TAKAHASHI, MINAMI··· (CHARACTER STRINGS) |
| | COLOR | BLACK & WHITE/AUTO COLOR/FULL COLOR |
| | SCAN SIZE | A4/A3/LETTER/LEGER |
| | SCAN SIDE | BOTH SIDES/ONE SIDE |
| | FORMAT | PDF/JPEG/TIFF |

FIG. 6

SETTING COMMAND

```
{
  "intent":"create_copy_job",
  "parameter":{
    "duplux":null,
    "color":"color",
    "number":"3",
    "combine":"two pages per sheet"
  }
}
```

FIG. 14

OUTPUT ORDER INFORMATION

```
{
  "MFP_ID":"MFP_12345",
  "read_order":[
    "number",
    "combine",
    "dulex",
    "color"
  ]
}
```

SPEECH SETTING SYSTEM, NON-TRANSITORY COMPUTER-READABLE RECORDING MEDIUM HAVING SPEECH SETTING ASSISTANCE PROGRAM STORED THEREON, AND SPEECH SETTING ASSISTANCE DEVICE

The entire disclosure of Japanese patent Application No. 2019-177406 filed on Sep. 27, 2019, is incorporated herein by reference in its entirety.

BACKGROUND

Technological Field

The present invention relates to a speech setting system, a speech setting assistance program and a speech setting assistance device. In particular, the present invention relates to a speech setting system that sets a job to be executed by an image processing apparatus based on a speech, a speech setting assistance program that is executed in the speech setting assistance device included in the speech setting system and a speech setting assistance device.

Description of the Related Art

Generally, a Multi Function Peripheral (hereinafter referred to as an MFP) is placed in an office. A user causes the MFP to execute a job that defines a process of printing image data, copying a document, scanning a document, storing image data, transmitting image data or the like. The technique for making notification of parameters of a job set in this MFP by speech has been known.

For example, Japanese Patent Laid-Open No. 2003-108182 describes an information processing apparatus that is configured to operate based on each setting value of a plurality of preset setting parameters and be capable of changing a setting value of each setting parameter by an external operation, and is characterized by comprising a setting change detection means for detecting a type of a set parameter and a setting value after the change in regard to a setting parameter a setting value of which has been changed from a predetermined reference setting value among the plurality of setting parameters before an operation that is based on each setting value starts, and a speech combining means for combining text data representing the type of the setting parameter and contents of the setting value after the change that are detected by the setting change detection means into a speech, and a speech output means for outputting a speech that is combined by the speech combining means.

However, the information processing apparatus described in Japanese Patent Laid-Open No. 2003-108182 outputs the type of the setting parameter and the setting value after the change by speech in regard to the setting parameter the setting value of which has been changed from the predetermined reference setting value. Therefore, in the case where the reference setting values are not stored in regard to all of the setting parameters, the user cannot confirm whether a correct setting value is set only by speech. Further, in the case where a setting value is displayed in a setting screen, the user can confirm the set setting value by viewing the setting screen. However, the user might overlook information when confirming the setting value only based on visually obtained information. In this manner, there is a problem that it is difficult to confirm whether a setting value is set correctly only by the setting screen.

SUMMARY

According to one aspect of the present invention, a speech setting system includes a job execution device that is capable of executing a job, and a speech setting assistance device that assists generation of the job to be executed by the job execution device based on speech information obtained from a speech, wherein the job execution device includes a first hardware processor, the first hardware processor is configured to execute the job in accordance with a parameter set for each of a plurality of setting items, and display a setting screen in which a plurality of the parameters respectively corresponding to the plurality of setting items are arranged, the speech setting assistance device includes a second hardware processor, and the second hardware processor is configured to determine the parameter corresponding to each of the plurality of setting items based on the speech information, and output speech output information for outputting the determined parameter corresponding to each of the plurality of setting items by speech in accordance with an output order that is defined based on a relative positional relationship among the plurality of parameters arranged in the setting screen.

According to another aspect of the present invention, the speech setting assistance program causes the computer to determine a plurality of parameters that are respectively set for a plurality of setting items based on speech information obtained from a speech in order to cause a job execution device to execute a job in accordance with the plurality of set parameters respectively corresponding to the plurality of setting items, and in the case where the job execution device displays a setting screen in which the plurality of set parameters respectively corresponding to the plurality of setting items are arranged, output speech output information for outputting the determined parameters respectively corresponding to the plurality of setting items by speech in accordance with an output order that is defined based on a relative positional relationship among the plurality of parameters arranged in the setting screen.

According to yet another aspect of the present invention, a speech setting assistance device includes a hardware processor, wherein the hardware processor is configured to determine a plurality of parameters that are respectively set for a plurality of setting items based on speech information obtained from a speech in order to cause a job execution device to execute a job in accordance with the plurality of set parameters respectively corresponding to the plurality of setting items, and in the case where the job execution device displays a setting screen in which the plurality of set parameters respectively corresponding to the plurality of setting items are arranged, output speech output information for outputting the determined parameters respectively corresponding to the plurality of setting items by speech in accordance with an output order that is defined based on a relative positional relationship among the plurality of parameters arranged in the setting screen.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 5 is a diagram showing one example of a parameter table;

FIG. 6 is a diagram showing one example of a setting command;

FIG. 14 is a diagram showing one example of display order information.

DETAILED DESCRIPTION OF EMBODIMENTS

Figure 1:
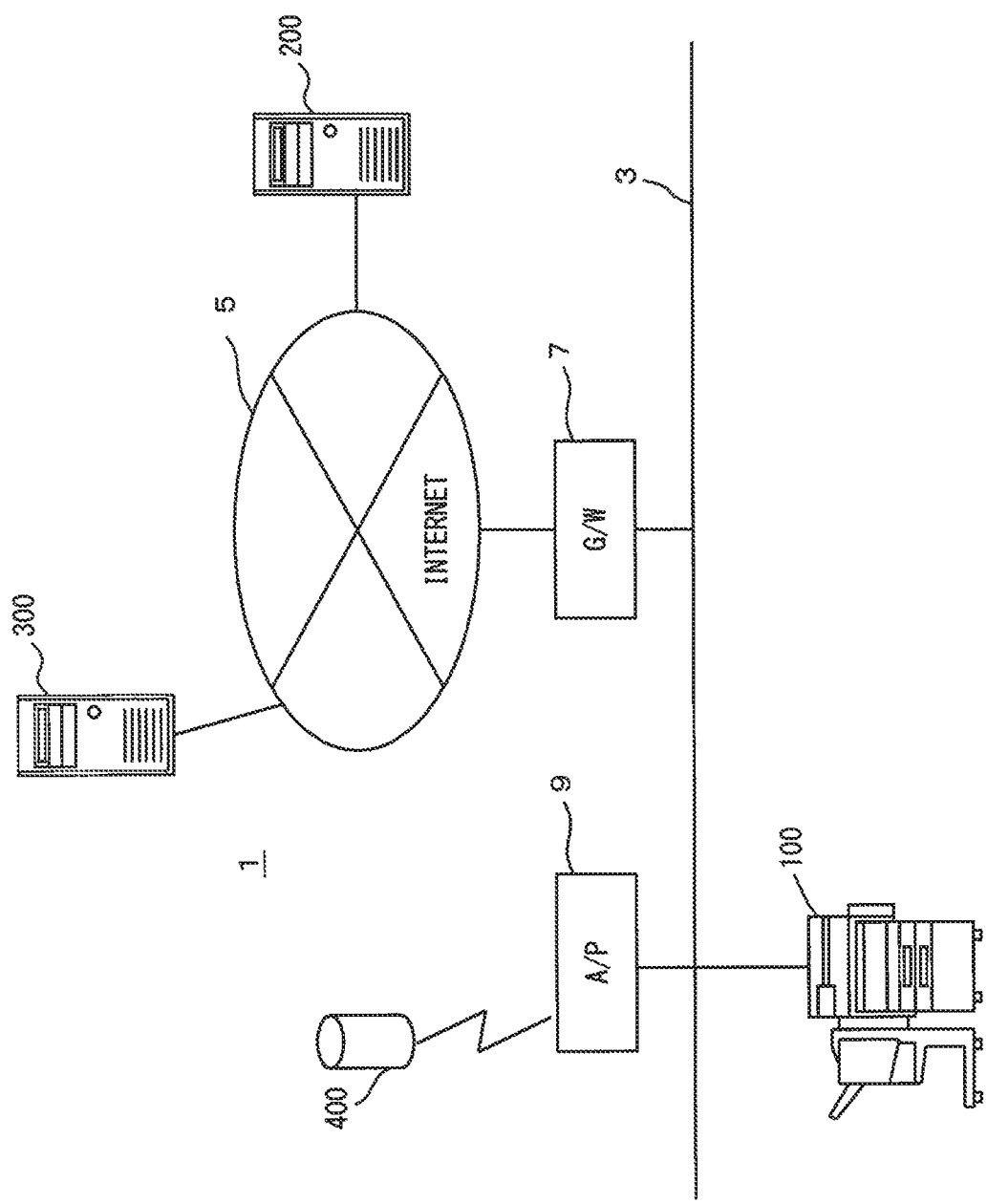
FIG. 1 is a diagram showing the overview of a speech setting system in one embodiment of the present invention.

Hereinafter, one or more embodiments of the present invention will be described with reference to the drawings. However, the scope of the invention is not limited to the disclosed embodiments.

In the following description, the same parts are denoted with the same reference characters. Their names and functions are also the same. Therefore, a detailed description thereof will not be repeated.

FIG. 1 is a diagram showing an overview of a speech setting system in one of the embodiments of the present invention. Referring to FIG. 1, the speech setting system 1 includes an MFP (Multi Function Peripheral) 100, a speech setting assistance server 200, a speech information generation server 300 and a smart speaker 400. The smart speaker 400 is arranged in the range of a predetermined distance from the MFP 100. The predetermined distance is preferably a distance that allows the smart speaker 400 to be able to collect a speech, which a user utters while viewing an operation panel of the MFP 100. The smart speaker 400 may be disposed next to the MFP 100.

The MFP 100 is one example of a job execution device. In the present embodiment, the MFP 100 is an image processing apparatus that processes an image by executing a job. The MFP 100 is connected to a network 3. The network 3 is a Local Area Network (LAN), for example. The network 3 is either wired or wireless. Further, the network 3 may be a Wide Area Network (WAN), a Public Switched Telephone Network (PSTN), the Internet or the like.

An access point (AP) 9 is connected to the network 3. The AP9 is a relay device having a wireless communication function. The smart speaker 400 is connected to the network 3 by communicating with the AP9.

A gateway (G/W) device 7 is connected to the network 3 and is connected to the Internet 5. The gateway device 7 relays the communication between the network 3 and the Internet 5. The speech setting assistance server 200 and the speech information generation server 300 are connected to the Internet 5. Therefore, each of the MFP 100 and the smart speaker 400 can communicate with the speech setting assistance server 200 or the speech information generation server 300 via the gateway device 7. Further, the speech setting assistance server 200 and the speech information generation server 300 can communicate with each other via the Internet 5.

The speech information generation server 300 provides a service of a virtual assistant with the smart speaker 400 as a user interface. Therefore, the user can have a conversation with the smart speaker 400. The virtual assistant is also referred to as an AI (Artificial Intelligence) assistant and is a well-known technique. The smart speaker 400 has a microphone, a speaker and a communication function. The speech information generation server 300 receives a user's speech collected by the smart speaker 400, and controls the smart speaker 400 to speak. The speech information generation server 300 has a function of performing natural language processing based on a speech. The speech information generation server 300 may have a learning function using a technique of AI including machine learning for natural language processing.

In the speech setting system 1 in the present embodiment, the user can set a job in the MFP 100 by speech using the service of a virtual assistant provided by the speech information generation server 300. The speech setting assistance server 200 is arranged between the MFP 100 to be controlled and the speech information generation server 300 that provides the service of a virtual assistant. The speech setting assistance server 200 controls the MFP 100.

Specifically, the smart speaker 400 and a device to be controlled are registered in the speech information generation server 300. Although the device to be controlled is the MFP 100, because the speech setting assistance server 200 controls the MFP 100 here, the speech setting assistance server 200 is registered in the speech information generation server 300 instead of the MFP 100 as the device to be controlled.

For example, in the speech setting system 1, an authentication server can be provided in order to associate the smart speaker 400 with the MFP 100. The speech setting assistance server 200 may have the function of an authentication server. Specifically, the authentication server issues a password in response to a request including an identification ID from the MFP 100. An administrator who administers the MFP 100 operates the MFP 100 and requests the authentication server to issue a password. The administrator operates a personal computer or the like, accesses the speech information generation server 300, associates the smart speaker 400 with the MFP 100 and registers the authentication server. A registration operation is an operation of associating the URL (Uniform Resource Locator) of the smart speaker with the identification ID of the MFP 100 and the password.

When the smart speaker 400 is associated with the MFP 100, the speech information generation server 300 requests the authentication server to issue an authentication token. Specifically, when the speech information generation server 300 transmits an issuance request including the identification ID of the MFP 100 and the password to the authentication server, if the identification information and the password are registered, the authentication server issues an authentication token and returns the authentication token to the speech information generation server 300. After receiving the authentication token with respect to the MFP 100, the speech information generation server 300 transmits speech information that is generated based on a speech collected by the smart speaker 400 to the speech setting assistance server 200 together with the authentication token of the MFP 100.

The speech setting assistance server 200 transmits the authentication token to the authentication server. Because the authentication server that receives the authentication token returns the identification ID of the MFP 100 corresponding to the authentication token, the speech setting assistance server 200 can specify the MFP 100 based on the identification ID.

Further, keywords that are prepared in advance as the information for extracting information for controlling the MFP 100 from a speech are registered in the speech information generation server 300. The keywords are the information relating to parameters that are set for execution of jobs by the MFP 100 which is to be controlled. Specifically, the keywords include job types and parameters used by the MFP 100 for execution of jobs. The parameters are the values set for each of a plurality of setting items defined for each job type. The speech information generation server 300 extracts information for controlling the MFP 100 from a speech uttered by the user, generates speech information including the extracted information and outputs the speech information to the speech setting assistance server 200. A parsing rule may be registered in the speech information generation server 300 for extraction of keywords from a speech.

For example, the user utters a word that is prepared in advance to specify the MFP 100 that is to be controlled such as the name assigned to the MFP 100 to the smart speaker 400. In this case, reference is made to the keywords registered in association with the MFP 100 in the speech information generation server 300, and speech information is generated. The speech information generation server 300 transmits the generated speech information to the speech setting assistance server 200. Here, character information is used in the speech information. The speech information is not limited to character information but may be a speech or a code.

The name assigned to the MFP 100 is "Bizhub," by way of example. In the case where the user utters "Make three color copies of two pages per sheet by Bizhub," the speech information is transmitted to the speech information generation server 300. The speech information generation server 300 specifies the MFP 100 based on the word "Bizhub," and extracts the words "three," "two pages per sheet," "color" and "copies" with reference to the keywords stored in the MFP 100 in advance. The speech information generation server 300 judge that the job type is 'COPY' based on the word "copies" in accordance with the parsing rule, determines that "three," "two pages per sheet" and "color" are parameters, and generates speech information including them. Then, the speech information generation server 300 transmits the speech information to the speech setting assistance server 200.

In the case where a job is set by speech, the user must remember the parameters that are settable for the job, which the user is about to set. Thus, the user may utter a parameter that is different from the parameters that are settable for the job. For example, the user may utter a parameter that is settable for another job type different from the job, which the user is about to set, but cannot be set for the job. In the speech setting system 1 in the present embodiment, the speech setting assistance server 200 has a function for such a case. The speech setting system 1 will be described below in detail.

Figure 2:
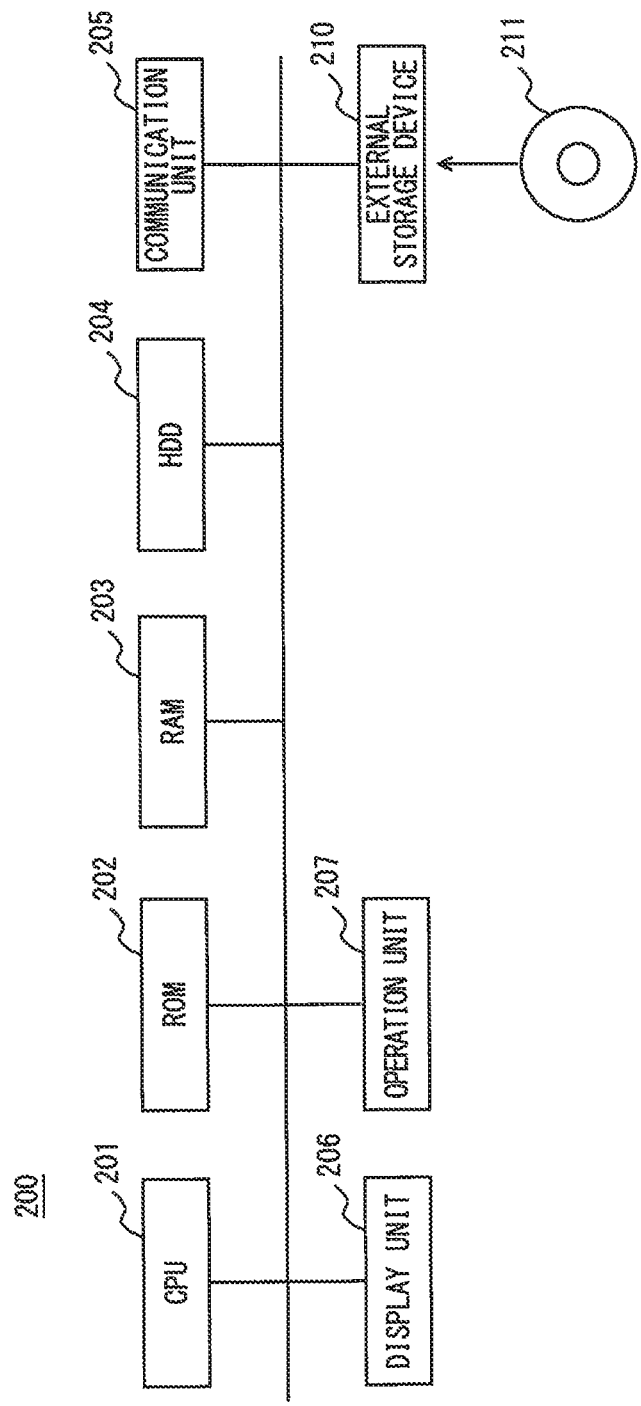
FIG. 2 is a block diagram showing one example of the outline of the hardware configuration of a speech setting assistance server.

FIG. 2 is a block diagram showing one example of the outline of the hardware configuration of the speech setting assistance server. Referring to FIG. 2, the speech setting assistance server 200 includes a CPU (Central Processing Unit) 201 for controlling the speech setting assistance server 200 as a whole, a ROM (Read Only Memory) 202 for storing a program to be executed by the CPU 201, a RAM (Random Access Memory) 203 that is used as a work area for the CPU 201, a HDD (Hard Disc Drive) 204 for storing data in a non-volatile manner, a communication unit 205 that connects the CPU 201 to the network 3, a display unit 206 that displays information, an operation unit 207 that accepts input by a user's operation and an external storage device 210.

The CPU 201 downloads a program from a computer connected to the Internet 5 and stores the program in the HDD 204. Further, in the case where the computer connected to the network 3 writes the program in the HDD 204, the program is stored in the HDD 204. The CPU 201 loads the program stored in the HDD 204 into the RAM 203 for execution.

The external storage device 210 is mounted with a CD-ROM (Compact Disk Read Only Memory) 211. In the present embodiment, the CPU 201 executes a program stored in the ROM 202 or the HDD 204, by way of example. However, the CPU 201 may control the external storage device 210 to read the program to be executed by the CPU 201 from the CD-ROM 211, and store the read program in the RAM 203 for execution.

A recording medium for storing a program to be executed by the CPU 201 is not limited to the CD-ROM 211 but may be a flexible disc, a cassette tape, an optical disc (MO (Magnetic Optical Disc)/MD(Mini Disc)/DVD(Digital Versatile Disc)), an IC card, an optical card, or a semiconductor memory such as a mask ROM or an EPROM (Erasable Programmable ROM). The program referred to here includes not only a program directly executable by the CPU 201 but also a source program, a compressed program, an encrypted program and the like.

Figure 3:
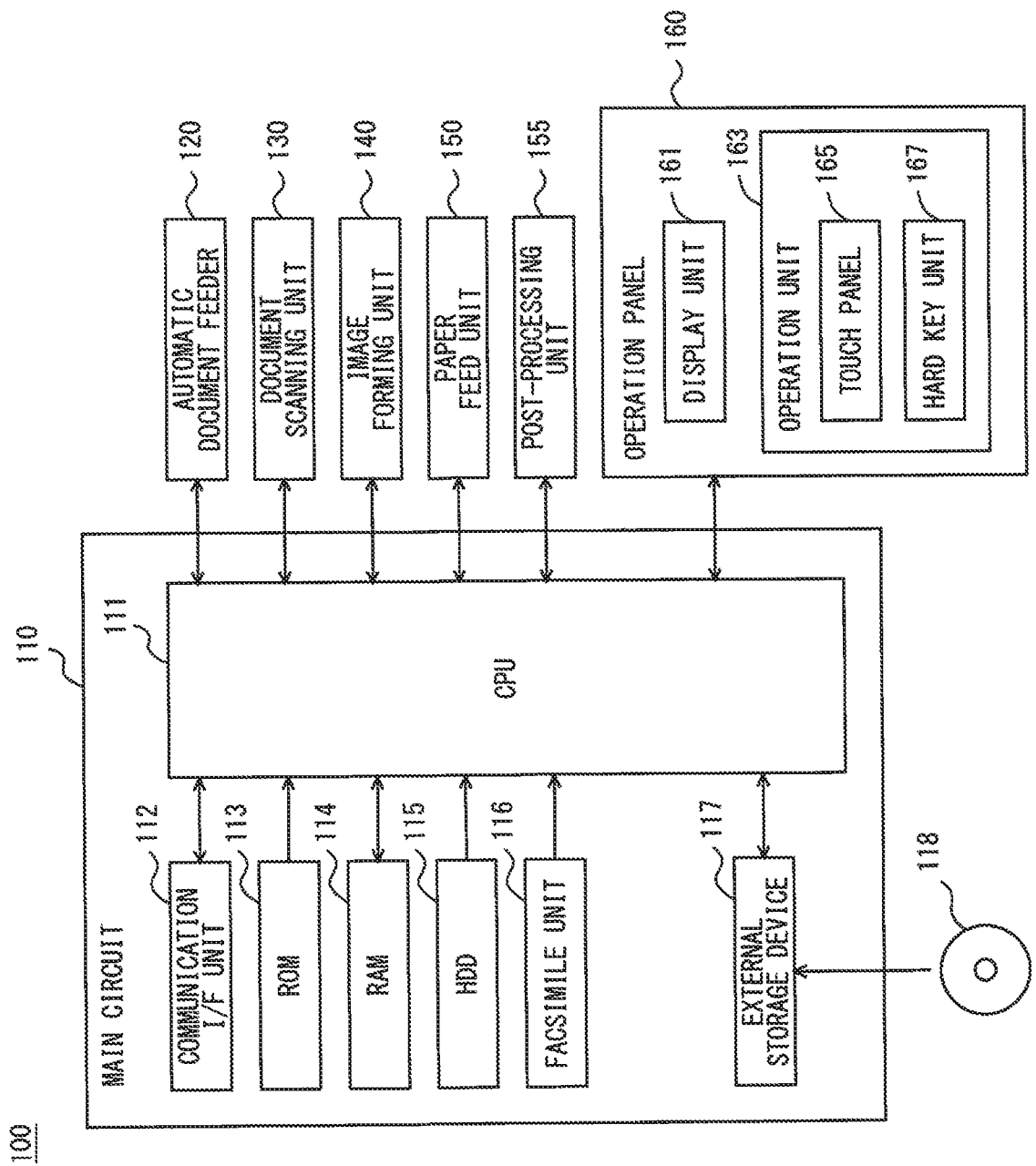
FIG. 3 is a block diagram showing the outline of the hardware configuration of an MFP.

FIG. 3 is a block diagram showing the outline of the hardware configuration of the MFP. Referring to FIG. 3, the MFP 100 includes a main circuit 110, a document scanning unit 130 for scanning a document, an automatic document feeder 120 for conveying a document to the document scanning unit 130, an image forming unit 140 for forming an image on a paper (a sheet of paper) or the like based on image data that is output by the document scanning unit 130 that has scanned a document, a paper feed unit 150 for supplying papers to the image forming unit 140, a post-processing unit 155 for processing a paper on which an image is formed and an operation panel 160 serving as a user interface.

The post-processing unit 155 performs a sorting process of sorting and discharging one or more papers on which images are formed by the image forming unit 140, a hole-punching process of punching the papers and a stapling process of stapling the papers.

The main circuit 110 includes a CPU 111, a communication interface (I/F) 112, a ROM 113, a RAM 114, a Hard Disc Drive (HDD) 115 that is used as a mass storage device, a facsimile unit 116 and an external storage device 117 mounted with the CD-ROM 118. The CPU 111 is connected to the automatic document feeder 120, the document scanning unit 130, the image forming unit 140, the paper feed unit 150, the post-processing unit 155 and the operation panel 160 to control the MFP 100 as a whole.

The ROM 113 stores a program to be executed by the CPU 111 or data required for execution of the program. The RAM 114 is used as a work area when the CPU 111 executes the program. Further, the RAM 114 temporarily stores image data successively transmitted from the document scanning unit 130.

The communication I/F unit 112 is an interface for connecting the MFP 100 to the network 3. The CPU 111 communicates with the smart speaker 400 via the communication I/F unit 112, and transmits and receives data. Further, the communication I/F unit 112 can communicate with a computer connected to the Internet 5 via the network 3.

The facsimile unit 116 is connected to the Public Switched Telephone Network (PSTN), transmits facsimile data to the PSTN or receives facsimile data from the PSTN. The facsimile unit 116 stores the received facsimile data in the HDD 115 or outputs the received facsimile data to the image forming unit 140. The image forming unit 140 prints the facsimile data received by the facsimile unit 116 on a paper. Further, the facsimile unit 116 converts the data stored in the HDD 115 into facsimile data and transmits the converted facsimile data to a facsimile machine connected to the PSTN.

The external storage device 117 is mounted with the CD-ROM 118. The CPU 111 can access the CD-ROM 118 via the external storage device 117. The CPU 111 loads the program recorded in the CD-ROM 118, which is mounted on the external storage device 117, into the RAM 114 for execution. A medium for storing a program to be executed by the CPU 111 is not limited to the CD-ROM 118 but may be an optical disc, an IC card, an optical card or a semiconductor memory such as a mask ROM or an EPROM.

Further, the program to be executed by the CPU 111 is not restricted to a program recorded in the CD-ROM 118, and the CPU 111 may load a program, stored in the HDD 115, into RAM 114 for execution. In this case, another computer connected to the network 3 may rewrite the program stored in the HDD 115 of the MFP 100, or may additionally write a new program therein. Further, the MFP 100 may download a program from another computer connected to the network 3 and store the program in the HDD 115. The program referred to here includes not only a program directly executable by the CPU 111 but also a source program, a compressed program, an encrypted program and the like.

The operation panel 160 is provided on an upper surface of the MFP 100 and includes the display unit 161 and the operation unit 163. The display unit 161 is a Liquid Crystal Display (LCD) or an organic EL (Electroluminescence) display, for example, and displays instruction menus to users, information about the acquired image data and the like. The operation unit 163 includes a touch panel 165 and a hard key unit 167. The touch panel 165 is superimposed on the upper surface or the lower surface of the display unit 161. The hard key unit 167 includes a plurality of hard keys. The hard keys are contact switches, for example. The touch panel 165 detects the position designated by the user on the display surface of the display unit 161.

Figure 4:
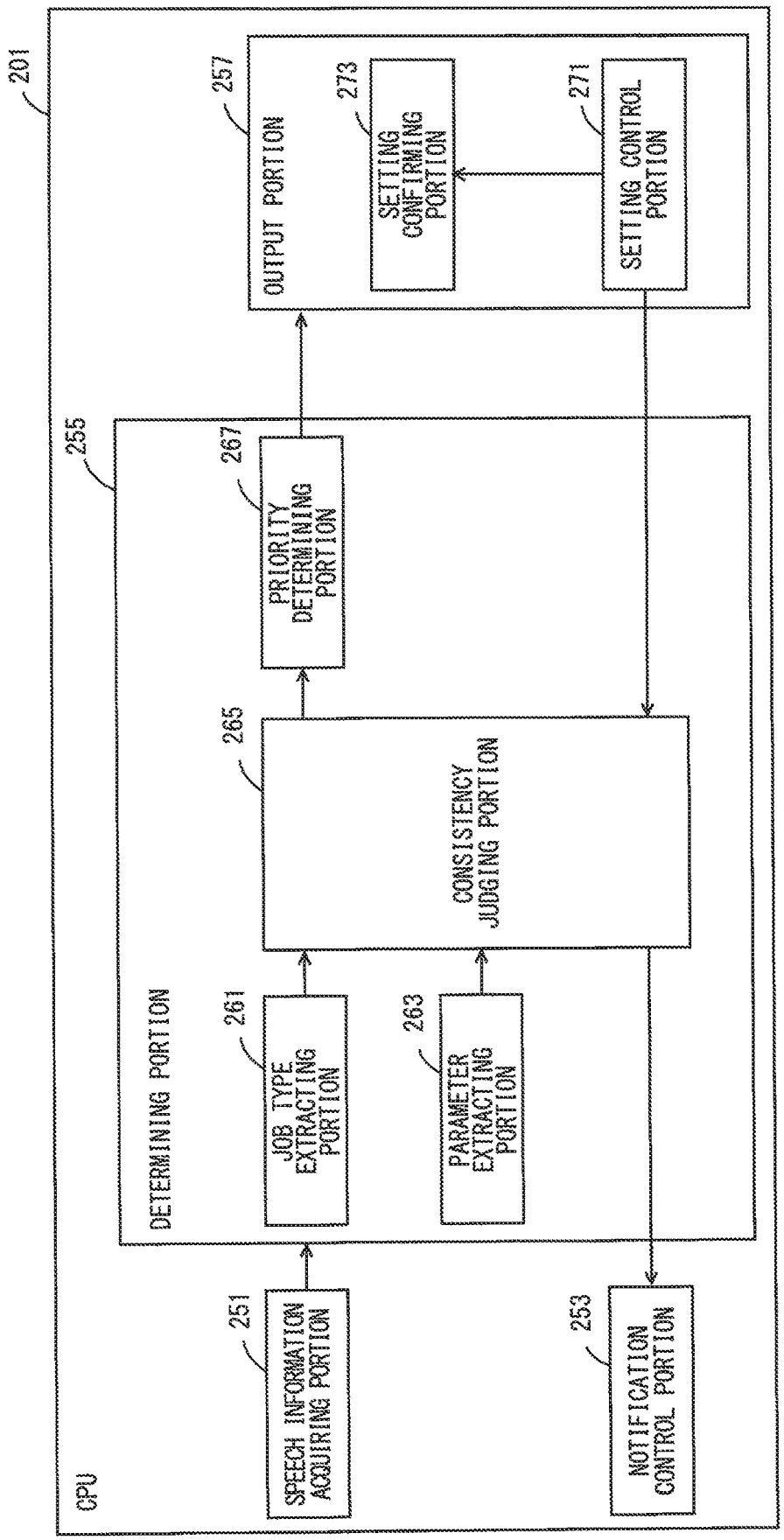
FIG. 4 is a block diagram showing one example of the functions of a CPU included in the speech setting assistance server.

FIG. 4 is a block diagram showing one example of the functions of the CPU included in the speech setting assistance server. The functions shown in FIG. 4 may be implemented by hardware, or may be implemented by the CPU 201 when the CPU 201 included in the speech setting assistance server 200 executes the program stored in the ROM 202, the HDD 204 or the CD-ROM 211. Here, the CPU 201 included in the speech setting assistance server 200 executes a speech setting assistance program, by way of example.

Referring to FIG. 4, the CPU 201 included in the speech setting assistance server 200 includes a speech information acquiring portion 251, a notification control portion 253, a determining portion 255 and an output portion 257. The speech information acquiring portion 251 acquires speech information received by the communication unit 205 from the speech information generation server 300. The speech information includes a job type and parameters. Job types indicate the types of jobs executable by the MFP 100. Parameters indicate values settable for setting items. Setting items indicate the types of parameters defined with respect to the job types.

The MFP 100 can execute a plurality of types of jobs. In the present embodiment, the plurality of types of jobs that are executable by the MFP 100 are a copy job of executing a copy process and a scan job of executing a scan process, by way of example. Further, the job type of a copy job is referred to as 'COPY,' and the job type of a scan job is referred to as 'SCAN.' In this case, 'COPY' and 'SCAN' are included as the keywords registered in the speech information generation server 300.

The determining portion 255 determines a job type and parameters of a job to be executed by the MFP 100 based on the speech information acquired by the speech information acquiring portion 251. Because parameters are set to correspond to each of one or more setting items defined with respect to a job type, the determining portion 255 determines a parameter corresponding to each of the one or more setting items.

The determining portion 255 includes a job type extracting portion 261, a parameter extracting portion 263, a consistency judging portion 265 and a priority determining portion 267. The job type extracting portion 261 extracts a job type from the speech information and outputs the extracted job type to the consistency judging portion 265. The parameter extracting portion 263 extracts parameters from the speech information and outputs the extracted parameters to the consistency judging portion 265. The parameter extracting portion 263 extracts the parameters from the speech information with reference to a parameter table. For example, the parameter extracting portion 263 extracts the same words as the words defined as parameters in the parameter table from the speech information.

FIG. 5 is a diagram showing one example of the parameter table. Referring to FIG. 5, the parameter table associates the job types, the setting items and the parameters with one another. The parameter table includes a plurality of parameter records. A parameter record includes an item for a job type, an item for a setting item and an item for a parameter. In the item for a job type, a job type is set. In the item for a setting item, the name of a setting item is set. In the item for a parameter, a settable parameter is set.

In the case where 'COPY' is set in the item for a job type, there are four parameter records, and the names of the setting items are 'COLOR,' 'SCAN-PRINT,' 'NUMBER OF COPIES' and 'TWO PAGES PER SHEET.'

In the case where the name of the setting item is 'COLOR,' the setting item corresponds to the parameters that define the number of colors for formation of images. As for the parameter record in which 'COLOR' is set as the name of the setting item, the item for parameters include three parameters: 'BLACK & WHITE,' 'AUTO COLOR' and 'FULL COLOR.' This indicates that one parameter from among 'BLACK & WHITE,' 'AUTO COLOR' and 'FULL COLOR' is settable in the case where the name of the setting item is 'COLOR.'

In the case where the name of the setting item is 'SCAN-PRINT,' the setting item corresponds to the parameters that define the scan side of a document and the formation side on which an image is to be formed. As for the parameter record in which 'SCAN-PRINT' is set as the name of the setting item, the item for parameters include four parameters: "DUPLEX-SCAN DUPLEX-PRINT,' 'SIMPLEX SCAN DUPLEX-PRINT,' 'DUPLEX-SCAN SIMPLEX-PRINT' and 'SIMPLEX-SCAN SIMPLEX-PRINT.' This indicates that one parameter from among 'DUPLEX-SCAN DUPLEX-PRINT,' 'SIMPLEX SCAN DUPLEX-PRINT,' 'DUPLEX-SCAN SIMPLEX-PRINT' and 'SIMPLEX-SCAN SIMPLEX-PRINT' is settable in the case where the name of the setting item is 'SCAN-PRINT.'

In the case where the name of the setting item is 'NUMBER OF COPIES,' the setting item corresponds to the parameters that define the number of sheets on which images are to be formed. As for the parameter record in which 'NUMBER OF COPIES' is set as the name of the setting item, the item for parameters include numerals. This indicates that any number is settable as a parameter in the case where the name of the setting item is 'NUMBER OF COPIES.'

In the case where the name of the setting item is 'TWO PAGES PER SHEET,' the setting item corresponds to the parameters that define execution or non-execution of a process of forming two pages per sheet. As for the parameter record in which 'TWO PAGES PER SHEET' is set as the name of the setting item, the item for parameters includes two parameters: 'ON' and 'OFF.' This indicates that one parameter from among 'ON' and 'OFF' is settable in the case where the name of the setting item is 'TWO PAGES PER SHEET.'

In the case where 'SCAN' is set in the item for a job type, there are six parameter records, and the names of the setting items are 'RESOLUTION,' 'DESTINATION,' 'COLOR,' 'SCAN SIZE,' 'SCAN SIDE' and 'FORMAT'.

In the case where the name of the setting item is 'RESOLUTION,' the setting item corresponds to the parameters that define resolution for scanning a document. As for the parameter record in which 'RESOLUTION' is set as the name of the setting item, the item for parameters includes three parameters: '300 dpi,' '400 dpi' and '600 dpi.' This indicates that any parameter from among '300 dpi,' '400 dpi' and '600 dpi' is settable in the case where the name of the setting item is 'COLOR.'

In the case where the name of the setting item is 'DESTINATION,' the setting item corresponds to parameters that define output destination of the data that is acquired when a document is scanned. As for the parameter record in which 'DESTINATION' is set as the name of the setting item, the item for parameters includes names for the addresses of output destination. This indicates that the address of the output destination is settable as a parameter in the case where the name of the setting item is 'DESTINATION.'

In the case where the name of the setting item is 'COLOR,' the setting item corresponds to the parameters that define the number of colors for scanning a document. As for the parameter record in which 'COLOR' is set as the name of the setting item, the item for parameters include three parameters: 'BLACK & WHITE,' 'AUTO COLOR' and 'FULL COLOR." This indicates that one parameter from among 'BLACK & WHITE,' 'AUTO COLOR' and 'FULL COLOR" is settable in the case where the name of the setting item is 'COLOR.'

In the case where the name of the setting item is 'SCAN SIZE,' the setting item corresponds to the parameters that define the size of a document. As for the parameter record in which 'SCAN SIZE' is set as the name of the setting item, the item for parameters includes four parameters: 'A4,' 'A3,' 'LETTER' and 'LEGER.' This indicates that any parameter from among 'A4,' 'A3,' 'LETTER' and 'LEGER' is settable in the case where the name of the setting item is 'SCAN SIZE.'

In the case where the name of the setting item is 'SCAN SIDE,' the setting item corresponds to the parameters that define the scan side of a document. As for the parameter record in which 'SCAN SIDE' is set as the name of the setting item, the item for parameters includes two parameters: 'BOTH SIDE' and 'ONE SIDE.' This indicates that any parameter between 'BOTH SIDE' and 'ONE SIDE' is settable in the case where the name of the setting item is 'SCAN SIDE.'

In the case where the name of the setting item is 'FORMAT,' the setting item corresponds to the parameters that define the format of image data acquired when a document is scanned. As for the parameter record in which 'FORMAT' is set as the name of the setting item, the item for parameters includes three parameters: 'PDF,' 'JPEG' and 'TIFF.' This indicates that one parameter from among 'PDF,' 'JPEG' and 'TIFF' is settable in the case where the name of the setting item is 'FORMAT.'

Returning to FIG. 4, the consistency judging portion 265 judges the consistency between a job type extracted from the speech information by the job type extracting portion 261 and a parameter extracted from the speech information by the parameter extracting portion 263. The consistency judging portion 265 judges the consistency between the job type and the parameter with reference to the parameter table. If the parameter is included in a plurality of parameter records set for the job type in the parameter table, the consistency judging portion 265 judges that the two are consistent. If the parameter is not included in any of the plurality of parameter records set for the job type, the consistency judging portion 265 judges that the two are inconsistent.

In the case where a set of a job type and a parameter is extracted from one speech information piece, the consistency judging portion 265 judges the consistency between the job type and the parameter. In the case where one of a job type and a parameter is extracted from one speech information piece, the consistency judging portion 265 judges the consistency between the one of a job type and a parameter, and a parameter or a job type that is extracted from another speech information piece. For example, in the case where a job type is extracted from the former speech information piece and a parameter is extracted from the latter speech information piece, the consistency judging portion 265 judges the consistency between the job type extracted from the former speech information piece and the parameter when the parameter is extracted. Further, in the case where a parameter is extracted from the former speech information piece and a job type is extracted from the latter speech information piece, the consistency judging portion 265 judges the consistency between the parameter extracted from the former speech information piece and the job type when the job type is extracted. Further, in the case where a job type is not extracted at a point in time at which a parameter is extracted from one speech information piece, the consistency judging portion 265 may judge the consistency between the job type of a job set in the MFP 100 and the parameter extracted from the speech information piece.

The consistency judging portion 265 outputs a result of determination to the priority determining portion 267. Further, in the case where judging that two are inconsistent, the consistency judging portion 265 outputs a notification instruction including a set of a job type and a parameter, which have been judged to be inconsistent, to the notification control portion 253.

In the case where the consistency judging portion 265 judges that two are inconsistent, the priority determining portion 267 determines that a job type is to be given priority to be set for a job over a parameter, and outputs the job type to the output portion 257. In the case where the consistency judging portion 265 judges that two are inconsistent, the priority determining portion 267 discards a parameter that is judged to be inconsistent with the job type.

The output portion 257 receives a job type or a parameter from the priority determining portion 267. The output portion 257 outputs a set of a job type and one or more parameters to the MFP 100. The output portion 257 outputs a job type and one or more parameters received from the priority determining portion 267 to the MFP 100. Each time a job type or a parameter is received from the priority determining portion 267, the output portion 257 stores it temporarily. The output portion 257 outputs the stored job type and the one or more stored parameters. In the case where receiving different parameters at different points in time in regard to the same setting item from the priority determining portion 267, the output portion 257 updates the parameter that is received first with the parameter that is received second from the priority determining portion 267.

The output portion 257 includes a setting control portion 271 and a setting confirming portion 273. The setting control portion 271 transmits a setting command including a set of a job type and one or more parameters to the MFP 100 and causes the MFP 100 to set the job type and the one or more parameters. Specifically, the setting control portion 271 transmits a parameter for each of the plurality of setting items defined for each of the job types to the MFP 100. The setting control portion 271 transmits a setting command to the MFP 100. The setting control portion 271 does not transmit the parameter for a setting item that is not received from the priority determining portion 267 to the MFP 100. In regard to a parameter of a setting item that is not received from the priority determining portion 267, the setting control portion 271 may acquire the parameter that is set in the MFP 100 from the MFP 100 and transmit the setting command which includes the parameter acquired from the MFP 100.

The setting confirming portion 273 outputs determined parameters respectively corresponding to the plurality of setting items by speech in accordance with the output order that is defined based on the relative positional relationship among the plurality of parameters arranged in the setting screen displayed in the MFP 100. The setting screen includes the plurality of parameters corresponding to each of the plurality of setting items. The setting confirming portion 273 determines the output order based on the positions in which the plurality of parameters are arranged in the setting screen. In the case where the plurality of parameters are arranged in a horizontal direction in the setting screen, the setting confirming portion 273 determines the order in which the plurality of parameters are arranged from the left to the right as the output order. In the case where the plurality of parameters are arranged in a vertical direction in the setting screen, the setting confirming portion 273 determines the order in which the plurality of parameters are arranged from the top to the bottom as the output order.

The setting screen displayed in the MFP 100 is defined for each of the plurality of job types. Here, in the MFP 100, a setting screen corresponding to a copy job the job type which is 'COPY' and a setting screen corresponding to a scan job the job type of which is 'SCAN' are defined. Thus, the setting confirming portion 273 stores the output order for the plurality of parameters arranged in the setting screen in advance for each of the plurality of job types. In the case where the arrangement of the plurality of parameters in the setting screen is changed in the MFP 100, the setting confirming portion 273 determines an output order based on the arrangement of the plurality of parameters in a changed setting screen. In that case, the setting confirming portion 273 may acquire the output order from the MFP 100 or may acquire the arrangement of the plurality of parameters in the setting screen from the MFP 100.

The setting confirming portion 273 generates speech output information for outputting by speech a parameter of each of the plurality of setting items defined for each of the job types in accordance with the output order. The setting confirming portion 273 transmits a confirmation command for providing an instruction for playing speech output information to the speech information generation server 300. In response to receiving the confirming command, the speech information generation server 300 plays the speech output information by speech from the smart speaker 400. Therefore, the user can confirm a plurality of parameters set for a job aurally while viewing the setting screen displayed in the display unit 161 of the MFP 100. Therefore, the user can easily confirm the parameters set for the job. Further, because the plurality of parameters are played in the order in which the plurality of parameters are arranged in the setting screen, the positions of the parameters being played by speech are easily specified.

The setting confirming portion 273 generates the speech output information not including a parameter such that the parameter for the setting item not received from the priority determining portion 276 is not output by speech. The setting confirming portion 273 may acquire the parameters set in the MFP 100 from the MFP 100, and may include the parameter acquired from the MFP 100 in the speech output information in regard to the parameter of the setting item not received from the priority determining portion 267.

FIG. 6 is a diagram showing one example of a setting command. Referring to FIG. 6, the setting command includes a job type and a plurality of parameters. "Create copy job" in the setting command indicates that the job type is 'COPY.' Duplex: null in the setting command indicates that a parameter is not set for the setting item 'SCAN-PRINT.' "Color": "color" in the setting command indicates that the parameter 'FULL COLOR' is set in the setting item 'COLOR.' "Number": "3" in the setting command indicates that the parameter '3' is set in the setting item 'NUMBER OF COPIES.' "Combine": "two pages per sheet" in the setting command indicates that the parameter 'ON' is set in the setting item 'TWO PAGES PER SHEET.'

Returning to FIG. 4, the setting control portion 271 outputs a set of a job type and parameters transmitted to the MFP 100 to the consistency judging portion 265. In the case where a job type is extracted but a parameter is not extracted from one speech information piece, the setting control portion 271 transmits the job type to the MFP 100 and outputs the job type to the consistency judging portion 265. Thereafter, in the case where a job type is not extracted but a parameter is extracted from one speech information piece, the consistency judging portion 265 judges the consistency between the parameter and the job type received from the setting control portion 271 when the parameter is extracted.

In response to receiving a notification instruction, the notification control portion 253 notifies the user that a parameter is not set. Specifically, the notification control portion 253 generates a speech message for notifying the user that a parameter is not set and transmits a notification command for providing an instruction for playing the speech message to the speech information generation server 300. When receiving the notification command, the speech information generation server 300 plays the speech message by speech from the smart speaker 400. Therefore, the user can be informed that a parameter is not set, thereby setting a parameter again by speech. Further, the notification control portion 253 generates a message of character information for notifying the user that a parameter is not set, and transmits a display command for providing an instruction for displaying the message to the MFP 100. When receiving the display command, the MFP 100 displays the message in the display unit 161. Therefore, the user can be informed that a parameter is not set, thereby being able to set a parameter again by speech or using the operation panel 160.

Figure 7:
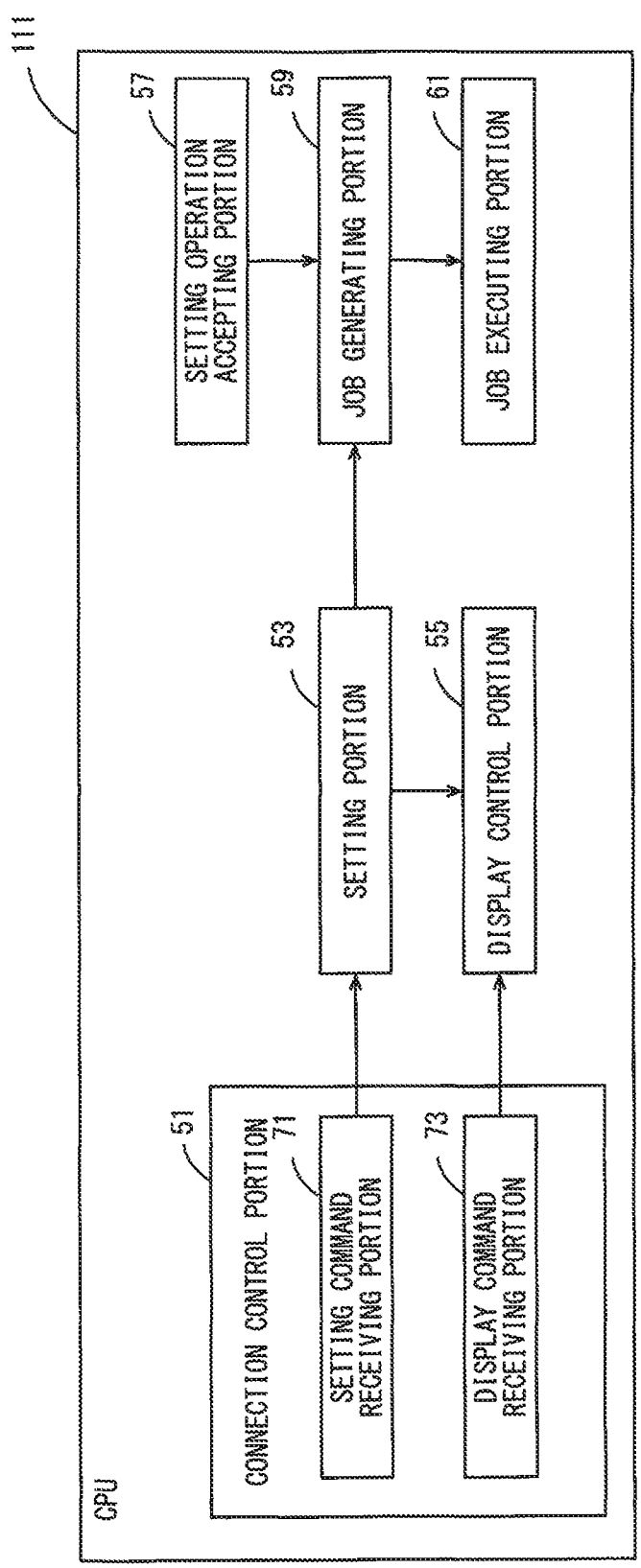
FIG. 7 is a block diagram showing one example of the functions of a CPU included in the MFP.

FIG. 7 is a block diagram showing one example of the functions of the CPU 111 included in the MFP. The functions shown in FIG. 7 may be implemented by hardware, or may be implemented by the CPU 111 in the case where the CPU 111 included in the MFP 100 executes a speech setting program and a job control program stored in the ROM 113, the HDD 115 or the CD-ROM 118. The speech setting program is part of the speech setting assistance program. Referring to FIG. 7, the CPU 111 includes a connection control portion 51, a setting portion 53, a display control portion 55, a setting operation accepting portion 57, a job generating portion 59 and a job executing portion 61. The connection control portion 51, the setting portion 53 and the display control portion 55 are the functions implemented by the CPU 111 in the case where the CPU 111 executes the speech setting program. The setting operation accepting portion 57, the job generating portion 59 and the job executing portion 61 are the functions implemented by the CPU 111 in the case where the CPU 111 executes the job control program.

The setting operation accepting portion 57 displays the setting screen in the display unit 161 and accepts a user's setting operation in the operation panel 160. The setting operation accepting portion 57 outputs the accepted setting operation to the job generating portion 59.

The job generating portion 59 generates a job in accordance with a setting operation accepted by the setting operation accepting portion 57. The job generating portion 59 sets a job type or a parameter in accordance with the setting operation accepted by the setting operation accepting portion 57. Specifically, the job generating portion 59 stores a job type and a parameter for each of the plurality of setting items in a predetermined area of the RAM 114. In the predetermined area of the RAM 114, default values are stored in regard to the job types and parameters. The job generating portion 59 updates the job type and a parameter for each of the plurality of setting items stored in the predetermined area of the RAM 114 with a job type or a parameter specified by a setting operation accepted by the setting operation accepting portion 57.

The job executing portion 61 controls the hardware resources to execute a job. The job executing portion 61 executes a job in accordance with a job type and a parameter stored in the RAM 114.

The hardware resources controlled by the job executing portion 61 include the communication I/F unit 112, the HDD 115, the facsimile unit 116, the automatic document feeder 120, the document scanning unit 130, the image forming unit 140, the paper feed unit 150, the post-processing unit 155 and the operation panel 160. Here, jobs include a copy job and a scan job. Jobs that are executable by the job executing portion 61 are not limited to these and may include other jobs. The copy job includes a scan process of causing the document scanning unit 130 to scan a document and a print process of causing the image forming unit 140 to form an image of the data that is output by the document scanning unit 130 that has scanned the document. The scan job includes a scan process of causing the document scanning unit 130 to scan a document and an output process of outputting the image data that is output by the document scanning unit 130 that has scanned the document. The output process includes a data storing process of causing the HDD 115 to store data and a data transmission process of causing the communication I/F unit 112 to transmit the data to the outside.

The connection control portion 51 controls the communication I/F unit 112 to communicate with the speech setting assistance server 200. The connection control portion 51 includes a setting command receiving portion 71 and a display command receiving portion 73. The setting command receiving portion 71 controls the communication I/F unit 112 to receive a setting command from the speech setting assistance server 200. In response to receiving the setting command, the setting command receiving portion 71 outputs the setting command to the setting portion 53. The display command receiving portion 73 controls the communication I/F unit 112 to receive a display command from the speech setting assistance server 200. In response to receiving the display command, the display command receiving portion 73 outputs the display command to the display control portion 55.

In response to receiving a setting command from the setting command receiving portion 71, the setting portion 53 sets a job type and a parameter included in the setting command. Specifically, the setting portion 53 updates a job type and a parameter for each of the plurality of setting items stored in the predetermined area of the RAM 114 with the job type and the parameter included in the setting command.

In response to reception of a display command by the display command receiving portion 73, the display control portion 55 displays the message included in the display command in the display unit 161.

Figure 8:
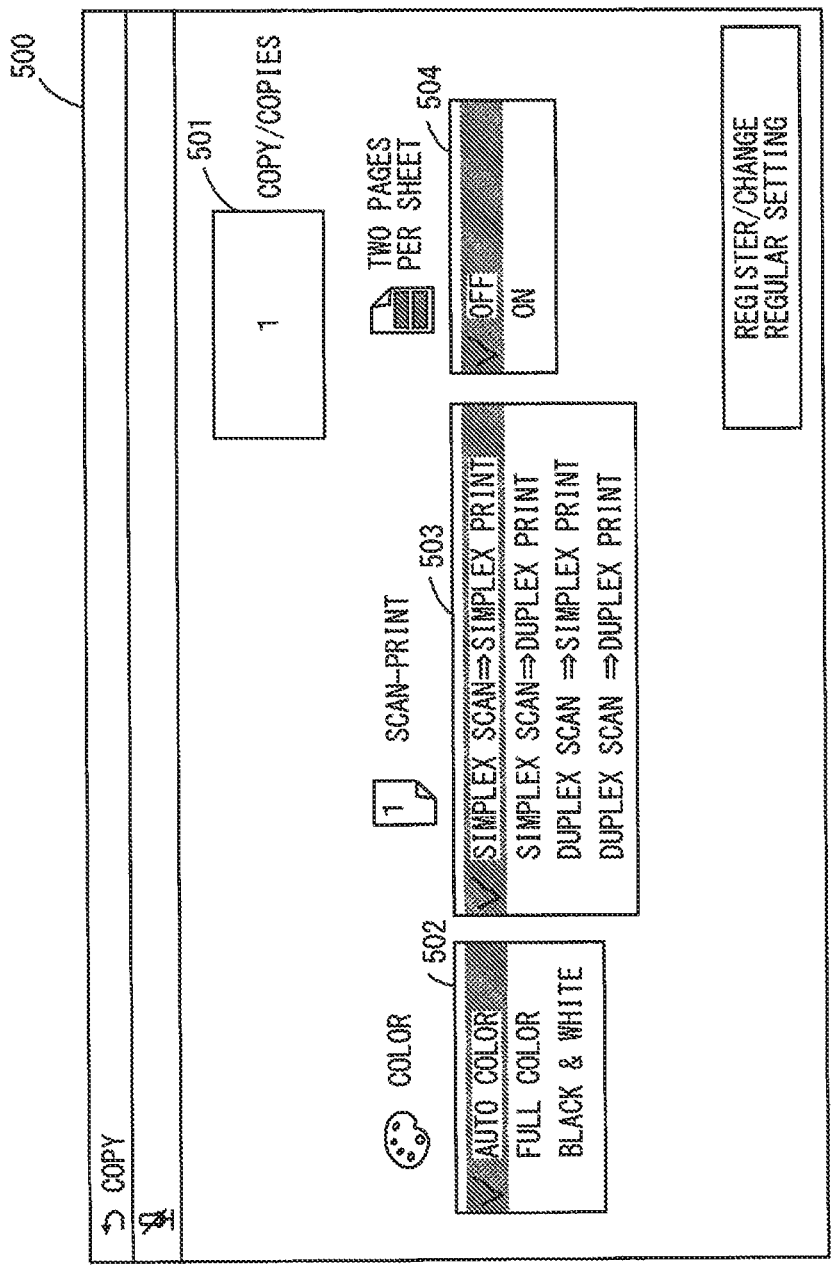
FIG. 8 is a first diagram showing one example of a setting screen.

FIG. 8 is a first diagram showing one example of the setting screen. FIG. 8 is the setting screen displayed in the display unit 161 in the case where the name of the job type is 'COPY.' Hatching is applied to the highlighted area in the diagram. Referring to FIG. 8, the setting screen 500 includes regions 501 to 504 that display parameters. In the region 501, the parameter "1" is set for the setting item 'NUMBER OF COPIES.' In the region 502, three settable parameters are displayed for the setting item 'COLOR,' the set parameter is highlighted, and a symbol is provided at the left. Here, the parameter "AUTO COLOR" is set for the setting item 'COLOR.' In the region 503, four settable parameters are displayed for the setting item 'SCAN-PRINT,' the set parameter is highlighted, and a symbol is provided at the left. Here, the parameter "SIMPLEX-SCAN SIMPLEX-PRINT" is set for the setting item 'SCAN-PRINT.' In the region 504, the two settable parameters are displayed for the setting item 'TWO PAGES PER SHEET,' the set parameter is highlighted, and a symbol is provided at the left. Here, the parameter "OFF" is set for the setting item 'TWO PAGES PER SHEET.'

Figure 9:
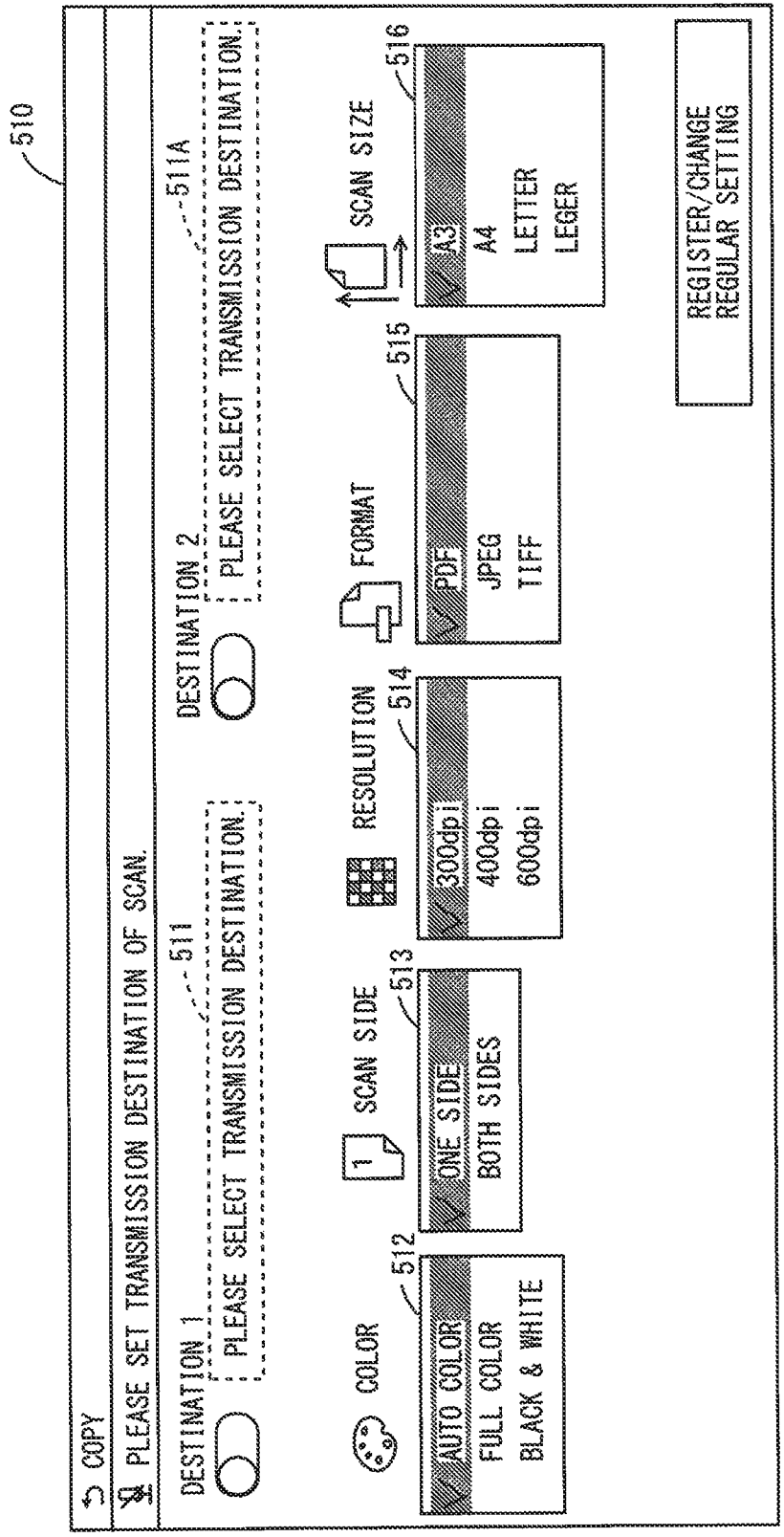
FIG. 9 is a second diagram showing one example of the setting screen.

FIG. 9 is a second diagram showing one example of the setting screen. FIG. 9 is a setting screen displayed in the display unit 161 in the case where the name of the job type is 'SCAN.' Hatching is applied to the highlighted area in the diagram. Referring to FIG. 9, the setting screen 510 includes regions 511 to 516 that display parameters. A parameter set for the setting item 'DESTINATION' is input in each of the regions 511, 511A. Here, a parameter is not set in either region. In the region 512, the three settable parameters are displayed in the setting item 'COLOR,' the set parameter is highlighted, and a symbol is provided at the left. Here, the parameter "AUTO COLOR" is set for the setting item 'COLOR.' In the region 513, the two settable parameters are displayed in the setting item 'SCAN SIDE,' the set parameter is highlighted, and a symbol is provided at the left. Here, the parameter "ONE SIDE" is set in the setting item 'SCAN SIDE.'

In the region 514, the three settable parameters are displayed in the setting item 'RESOLUTION,' the set parameter is highlighted and a symbol is provided at the left. Here, the parameter "300 dpi" is set in the setting item 'RESOLUTION.' In the region 515, the three settable parameters are displayed in the setting item 'FORMAT,' the set parameter is highlighted and a symbol is provided at the left. Here, the parameter "PDF" is set in the setting item 'FORMAT.' In the region 516, the four settable parameters are displayed in the setting item 'SCAN SIZE,' the set parameter is highlighted, and a symbol is provided at the left. Here, the parameter "A3" is set in the setting item 'SCAN SIZE.'

Figure 10:
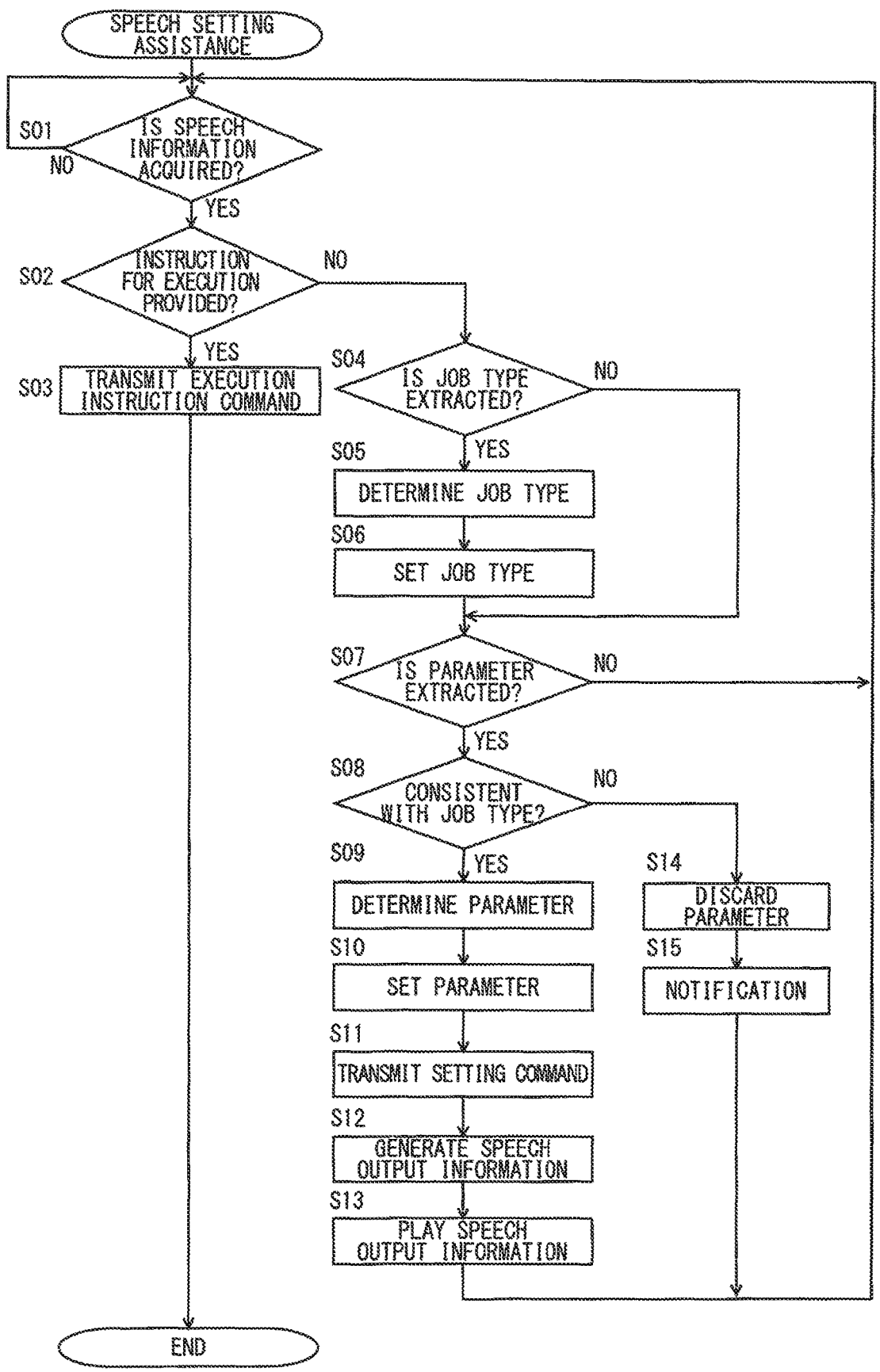
FIG. 10 is a flowchart showing one example of a flow of a speech setting assistance process.

FIG. 10 is a flowchart showing one example of a flow of a speech setting assistance process. The speech setting assistance process is a process executed by the CPU 201 in the case where the CPU 201 included in the speech setting assistance server 200 executes the speech setting assistance program stored in the ROM 202, the HDD 204 or the CD-ROM 211.

Referring to FIG. 10, the CPU 201 included in the speech setting assistance server 200 judges whether speech information has been acquired (step S01). In the case where speech information is received from the speech information generation server 300, the process proceeds to the step S02. If not, the process returns to the step S0l. In the step S02, the CPU 201 judges whether an execution instruction has been accepted. The CPU 201 judges that the execution instruction has been accepted in the case where the speech information includes a word representing the execution instruction. Words representing the execution instruction are "START" and "EXECUTE A JOB," for example, and may be defined in advance. If the execution instruction has been accepted, the process proceeds to the step S03. If not, the process proceeds to the step S04. In the step S03, an execution instruction command is transmitted to the MFP 100, and the process ends. In the MFP 100, a job specified by the job type that is set at a point in time at which the execution instruction command is received is executed in accordance with a parameter that is set at that point in time.

In the step S04, the CPU 201 judges whether a job type is extracted from the speech information. If the job type is extracted, the process proceeds to the step S05. If not, the process proceeds to the step S07. In the step S05, the CPU 201 determines the job type extracted from the speech information, and the process proceeds to the step S06. The determined job type is set as a job in the step S06, and the process proceeds to the step S07. In the case where a job type is not set by then, or the case where a job type is changed from a job type that has been set by then, because a job type is set, no value such as null is set as the parameters set for the plurality of setting items corresponding to the set job type.

In the step S07, the CPU 201 judges whether a parameter is extracted from the speech information. If a parameter is extracted, the process proceeds to the step S08. If not, the process returns to the step S01. In the step S08, the CPU 201 judges whether the parameter extracted from the speech information is consistent with the job type. If the parameter is consistent with the job type, the process proceeds to the step S09. If not, the process proceeds to the step S14. In the case where the step S06 is performed after the speech information is acquired in the step S01, a job type the consistency of which with a parameter is to be determined is the job type set in the step S06. In this case, a job type and a parameter are extracted from one speech information piece. In the case where the step S08 is performed without the step S06 after the speech information is acquired in the step S01, a job type consistency of which with a parameter is to be determined is the job type that is set at that point in time. In the case where the step S06 is performed earlier than the point in time at which the step S08 is performed, a job type the consistency of which with a parameter is to be determined is the job type that is set at the point in time at which the step S06 is performed. In the case where a job type is not set, there is no job type the consistency of which with a parameter is to be determined. Thus, the process proceeds to the step S14. The job type that is set in the MFP 100 may be set as a job type before the step S06 is performed first.

In the case where a job type and a parameter are inconsistent with each other, the job type is given priority over the parameter for determination. It has been confirmed by an experiment that the probability of erroneously setting a job type is smaller than the probability of erroneously setting a parameter in the case where the user sets a job by speech. Further, in the case where setting a job by speech, the user may set a parameter that cannot be set for a job type. For example, in the case where setting a copy job, the user may utter a parameter settable for the setting item 'FORMAT' of a scan job and utter "Make a copy in PDF" or the like. In this manner, in the case where a job type and a parameter are inconsistent with each other, the job type is given priority over the parameter. Thus, the job type, which the user essentially attempting to set, can be set reliably. Thus, a job type can be prevented from being set erroneously, and a job can be set easily.

In the step S09, the parameter extracted in the step S07 is determined, and the process proceeds to the step S10. In the step S10, the determined parameter is set for the job, and the process proceeds to the step S11. In the step S11, a setting command is transmitted to the MFP 100, and the process proceeds to the step S12.

In the step S12, speech output information is generated, and the process proceeds to the step S13. For example, in the case where 'COPY' is determined as a job type, the setting screen shown in FIG. 8 is displayed in the MFP 100. In this case, the output order is the order of the setting items 'NUMBER OF COPIES,' 'COLOR,' 'SCAN-PRINT' and 'TWO PAGES PER SHEET.' The parameter that is arranged at the top in the vertical direction of the setting screen and corresponds to the setting item 'NUMBER OF COPIES' is output first. Out of the parameters arranged in the second row from the top in the vertical direction are the setting items 'COLOR,' 'SCAN-PRINT' and 'TWO PAGES PER SHEET,' the parameter that is arranged at the leftmost position and corresponds to the setting item 'COLOR' is output second, the parameter that is arranged in the middle position and corresponds to the setting item 'SCAN-PRINT' is output third, and the parameter that is arranged at the rightmost position and corresponds to the setting item 'TWO PAGES PER SHEET' is output fourth.

Further, in the case where 'SCAN' is determined as a job type, the setting screen shown in FIG. 9 is displayed in the MFP 100. In this case, the output order is the order of the setting items 'DESTINATION,' 'SCAN SIDE,' 'RESOLUTION,' 'FORMAT' and 'SCAN SIZE.' The parameter that is arranged at the top in the vertical direction of the setting screen and corresponds to the setting item 'DESTINATION' is output first. Out of the parameters arranged in the second row from the top in the vertical direction are the setting items 'COLOR,' 'SCAN SIDE,' 'RESOLUTION,' 'FORMAT' and 'SCAN SIZE', the parameter that is arranged at the leftmost position and corresponds to the setting item 'COLOR' is output second, the parameter that is arranged at the second leftmost position and corresponds to the setting item 'SCAN-SIDE' is output third, the parameter that is arranged at the middle position and corresponds to the setting item 'RESOLUTION' is output fourth, the parameter that is arranged at the second rightmost position and corresponds to the setting item 'FORMAT' is output fifth, and the parameter that is arranged at the rightmost position and corresponds to the setting item 'SCAN SIZE' is output sixth. Because not being set, the parameter for the setting item 'DESTINATION' is not included in the speech output information.

The speech output information is played in the step S13, and the process returns to the step S01. Specifically, a confirmation command for providing an instruction for playing the speech output information is transmitted to the speech information generation server 300, and the speech output information is played by the smart speaker 400. Thus, the user can confirm the parameter played by speech aurally and the parameter included in the setting screen displayed in the display unit 161 of the MFP 100 visually.

The parameter extracted in the step S07 is discarded in the step S14, and the process proceeds to the step S15. A notification process is performed in the step S15, and the process returns to the step S01. Specifically, a notification command is transmitted to the speech information generation server 300, and a display command is transmitted to the MFP 100.

The speech setting assistance server 200 in the present embodiment receives speech information from the speech information generation server 300 and then transmits a confirmation command to the speech information generation server 300. Although transmitting a confirmation command after transmitting a setting command, the speech setting assistance server 200 may transmit a confirmation command without transmitting a setting command. For example, the speech setting assistance server 200 may transmit a confirmation command to the speech information generation server 300 after the user utters the speech that confirms the setting contents.

Figure 11:
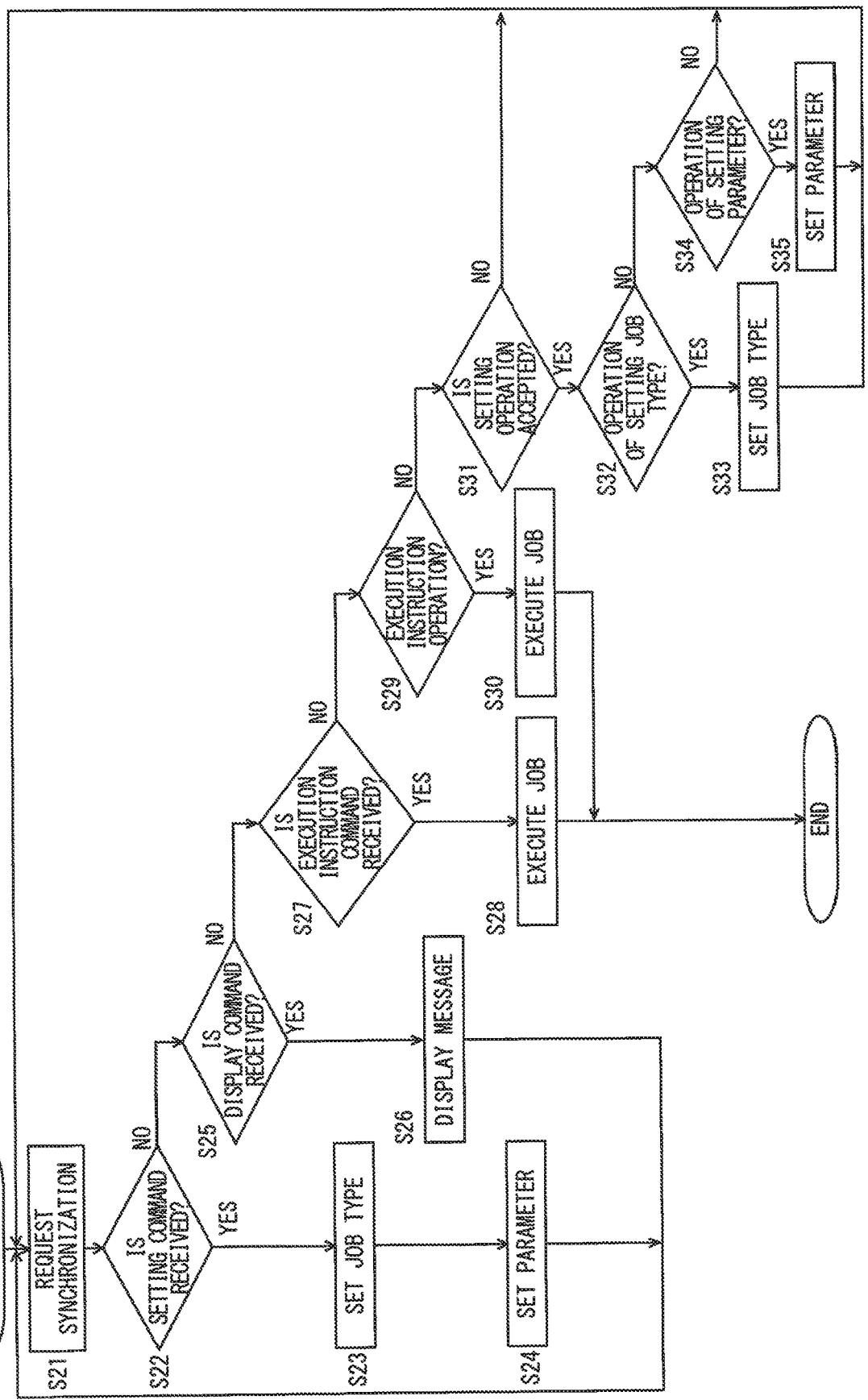
FIG. 11 is a flowchart showing one example of a flow of a device setting process.

FIG. 11 is a flowchart showing one example of a flow of a device setting process. The device setting process is a process executed by the CPU 111 in the case where the CPU 111 included in the MFP 100 executes the speech setting program and the job control program stored in the ROM 113, the HDD 115 or the CD-ROM 118. Referring to FIG. 11, the CPU 111 requests the speech setting assistance server 200 to synchronize (step S21), and the process proceeds to the step S22. Specifically, the CPU 111 requests the speech setting assistance server 200 to transmit a job type and a plurality of parameters that are set in the speech setting assistance server 200. The speech setting assistance server 200 transmits any one of a setting command, an execution instruction command and a display command in response to a request from the MFP 100.

In the step S22, the CPU 111 judges whether a setting command is received from the speech setting assistance server 200. If the setting command is received, the process proceeds to the step S23. If not, the process proceeds to the step S25. A job type is set for a job in accordance with the setting command in the step S23, and the process proceeds to the step S24. A parameter is set for the job in accordance with the setting command in the step S24, and the process returns to the step S21.

In the step S25, the CPU 111 judges whether a display command is received from the speech setting assistance server 200. If the display command is received, the process proceeds to the step S26. If not, the process proceeds to the step S27. A message included in the display command is displayed in the display unit 161 in the step S26, and the process returns to the step S21.

In the step S27, the CPU 111 judges whether an execution instruction command is received from the speech setting assistance server 200. If the execution instruction command is received, the process proceeds to the step S28. If not, the process proceeds to the step S29. A job is executed in the step S28, and the process ends.

In the step S29, the CPU 111 judges whether an execution instruction operation that is input by the user using the operation panel 160 is accepted. If the execution instruction operation is accepted, the process proceeds to the step S30. If not, the process proceeds to the step S31. A job is executed in the step S30, and the process ends.

In the step S31, the CPU 111 judges whether a setting operation that is input by the user using the operation panel 160 is accepted. If the setting operation is accepted, the process proceeds to the step S32. If not, the process returns to the step S21. In the step S32, the CPU 111 judges whether the setting operation is an operation of setting a job type. If the setting operation is an operation of setting a job type, the process proceeds to the step S33. If not, the process proceeds to the step S34. The job type specified by the setting operation is set for a job in the step S33, and the process returns to the step S21. In the step S34, the CPU 111 judges whether the setting operation is an operation of setting a parameter. If the setting operation is an operation of setting a parameter, the process proceeds to the step S35. If not, the process returns to the step S21. The parameter specified by the setting operation is set for a job in the step S35, and the process returns to the step S21.

FIRST INVENTIVE EXAMPLE

The user utters "Make three color copies in PDF by Bizhub," by way of example. The speech information generation server 300 determines 'COPY' as a job type and generates the speech information including the parameters "THREE," "PDF" and "COLOR" based on the speech acquired from the smart speaker 400, and transmits the speech information to the speech setting assistance server 200.

The speech setting assistance server 200 that receives the speech information judges the consistency between the job type and the parameters based on the speech information with reference to the parameter table. In the case of this example, although the parameters "THREE" and "COLOR" are consistent with the job type 'COPY,' "PDF" is inconsistent with the job type 'COPY.' In this case, a notification command is transmitted to the speech information generation server 300, and a display command is transmitted to the MFP 100.

The notification command includes a speech message "Parameter PDF was not set," for example. The speech information generation server 300 that receives the notification command causes the smart speaker 400 to output the speech message by speech. Thus, the user can be informed aurally that the parameter "PDF" was not set.

A display command includes the message "Parameter 'PDF' was not set," for example. The MFP 100 that receives the display command displays the message in the display unit 161. Thus, the user can be informed by the message displayed in the display unit 161 that the parameter "PDF" was not set.

Further, the speech setting assistance server 200 generates speech output information including character information "Do you want to make three color copies?" based on the speech information, and transmits a confirmation command of providing an instruction for playing the speech output information to the speech information generation server 300. The speech information generation server 300 that receives the confirmation command causes the smart speaker 400 to output the character information specified by the speech output information by speech. Thus, the user can confirm the parameters based on the speech output information played by speech and the setting screen.

SECOND INVENTIVE EXAMPLE

The user utters "Make three color copies in two pages per sheet by Bizhub," by way of example. The speech information generation server 300 determines 'COPY' as a job type and generates the speech information including the parameters "THREE," "TWO PAGES PER SHEET" and "COLOR" based on the speech acquired from the smart speaker 400, and transmits the speech information to the speech setting assistance server 200.

The speech setting assistance server 200 that receives the speech information judges the consistency between the job type and the parameters based on the speech information with reference to the parameter table. In the case of this example, the parameters "THREE," "TWO PAGES PER SHEET" and "COLOR" are consistent with the job type 'COPY.' Therefore, the speech setting assistance server 200 generates speech output information including character information "Do you want to make three color copies of two pages per sheet?" based on the speech information and transmits a confirmation command for providing an instruction for playing the speech output information to the speech information generation server 300. The speech information generation server 300 that receives the confirmation command causes the smart speaker 400 to output the character information specified by the speech output information by speech. Thus, the user can confirm the parameters based on the speech output information played by speech and the setting screen.

In the speech setting system 1 in the present embodiment, as described above, the MFP 100 displays the setting screen in which the plurality of parameters corresponding to each of the plurality of setting items are arranged and executes a job in accordance with the parameters set for each of the plurality of setting items. The speech setting assistance server 200 determines a parameter corresponding to each of the plurality of setting items based on the speech information acquired from the speech, and outputs the speech output information for outputting the determined parameter corresponding to each of the plurality of setting items by speech in accordance with the output order that is defined based on the relative positional relationship among the plurality of parameters arranged in the setting screen. Thus, the user can confirm the parameters based on the speech output information output by speech while viewing the setting screen displayed in the MFP 100.

Further, in the case where one or more parameters respectively corresponding to one or more setting items among the plurality of setting items are determined, the speech setting assistance server 200 outputs the speech output information for outputting the one or more determined parameters by speech in accordance with the output order. Thus, the user can confirm the parameters that are set based on the speech information acquired from the speech aurally.

Further, the speech setting assistance server 200 causes the speech information generation server 300 to output the speech based on the speech output information from the smart speaker 400. Thus, the user can confirm the speech output information aurally.

Further, the relative positional relationship among the plurality of parameters arranged in the setting screen displayed in the MFP 100 is predetermined. Thus, because the predetermined output order is stored in the speech setting assistance server 200, the configuration of the system can be simplified.

Further, in the case where the relative positional relationship among the plurality of parameters arranged in the setting screen is changed in the MFP 100, the speech setting assistance server 200 outputs the speech output information for outputting a determined parameter corresponding to each of the plurality of setting items by speech in accordance with the output order defined based on the relative positional relationship among the plurality of parameters arranged in the setting screen after the change. Therefore, the user can easily confirm the parameter aurally while viewing the setting screen after the change.

Further, in the case where the plurality of parameters are arranged in the horizontal direction of the setting screen, the order in which the plurality of parameters are arranged from the left to the right is defined as the output order. In the case where the plurality of parameters are arranged in the vertical direction of the setting screen, the order in which the plurality of parameters are arranged from the top to the bottom is defined as the output order. Therefore, the movement of line of user's sight is reduced when the user confirms the setting screen while listening to a speech, so that the user can easily perform a confirming work visually.

FIRST MODIFIED EXAMPLE

Figure 12:
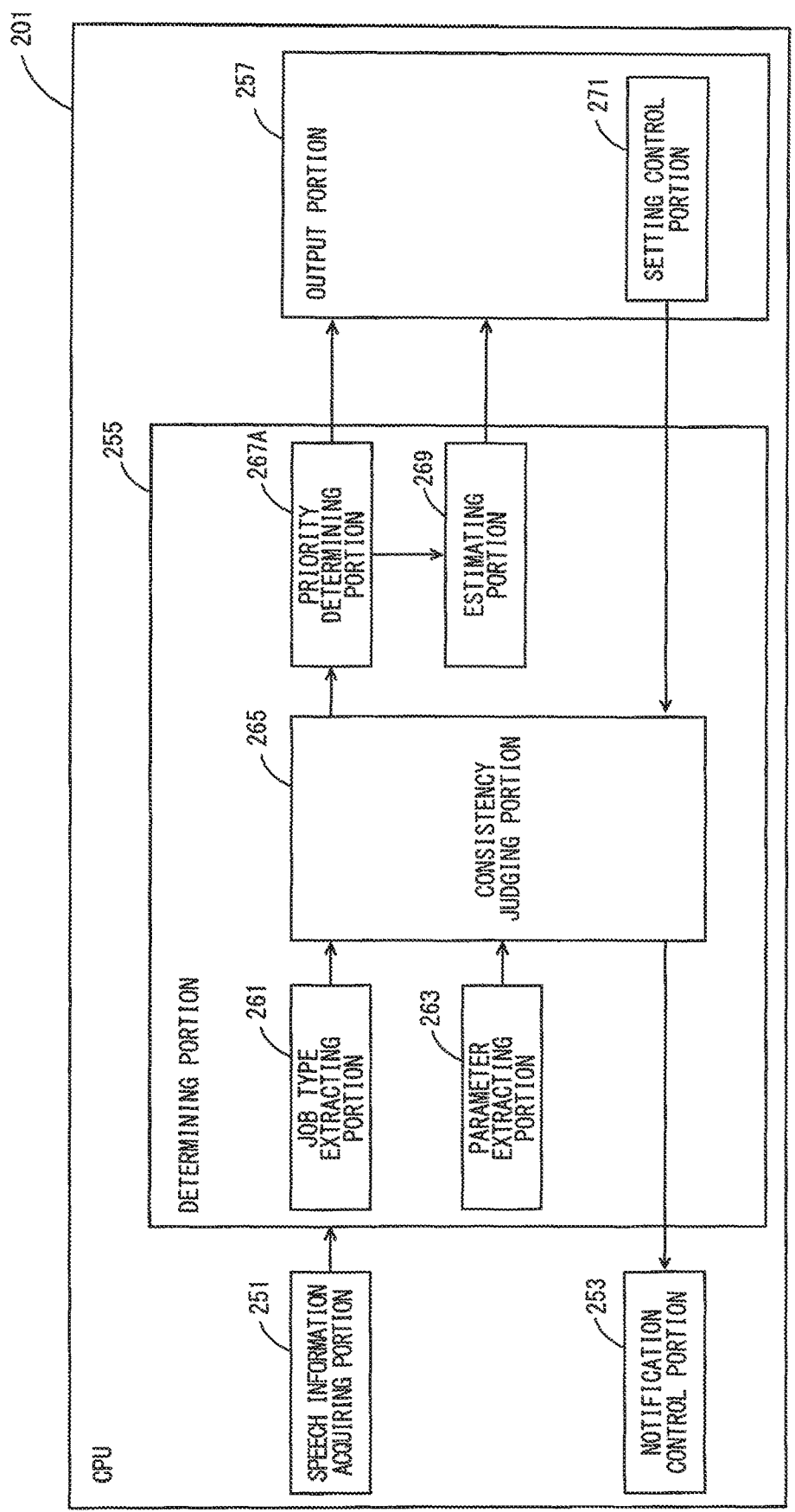
FIG. 12 is a block diagram showing one example of the functions of a CPU included in the speech setting assistance server in a first modified example.

FIG. 12 is a block diagram showing one example of the functions of a CPU included in a speech setting assistance server in a first modified example. Referring to FIG. 12, differences from the functions shown in FIG. 4 are that an estimating portion 269 is added, and the priority determining portion 267 is changed to a priority determining portion 267A. The other functions are the same as the functions shown in FIG. 4. Therefore, a description thereof will not be repeated.

In the case where the consistency judging portion 265 judges that a job type and a parameter are inconsistent with each other, the priority determining portion 267A determines that a job type is to be given priority to be set for a job over a parameter, and outputs the job type to the output portion 257. In the case where the consistency judging portion 265 judges that a job type and a parameter are inconsistent with each other, the priority determining portion 267A outputs an estimation instruction to the estimating portion 269.

In response to receiving the estimation instruction, the estimating portion 269 estimates a new different parameter that is consistent with the job type based on the parameter that is judged to be inconsistent with the job type. The estimating portion 269 estimates a new parameter with reference to the history of changes of parameters in the past. For example, in the case where speech information includes a character string "DUPLEX COPY," 'COPY' is determined as a job type, and the parameter "BOTH SIDES" is judged to be inconsistent. In this case, in the case where the frequency of setting "DUPLEX SCAN-SIMPLEX PRINT" as a parameter for the setting item 'SCAN-PRINT' is high in the history, "DUPLEX SCAN-SIMPLEX PRINT" is estimated as a new parameter. The estimating portion 269 may have a learning function using a technique of AI including machine learning.

Figure 13:
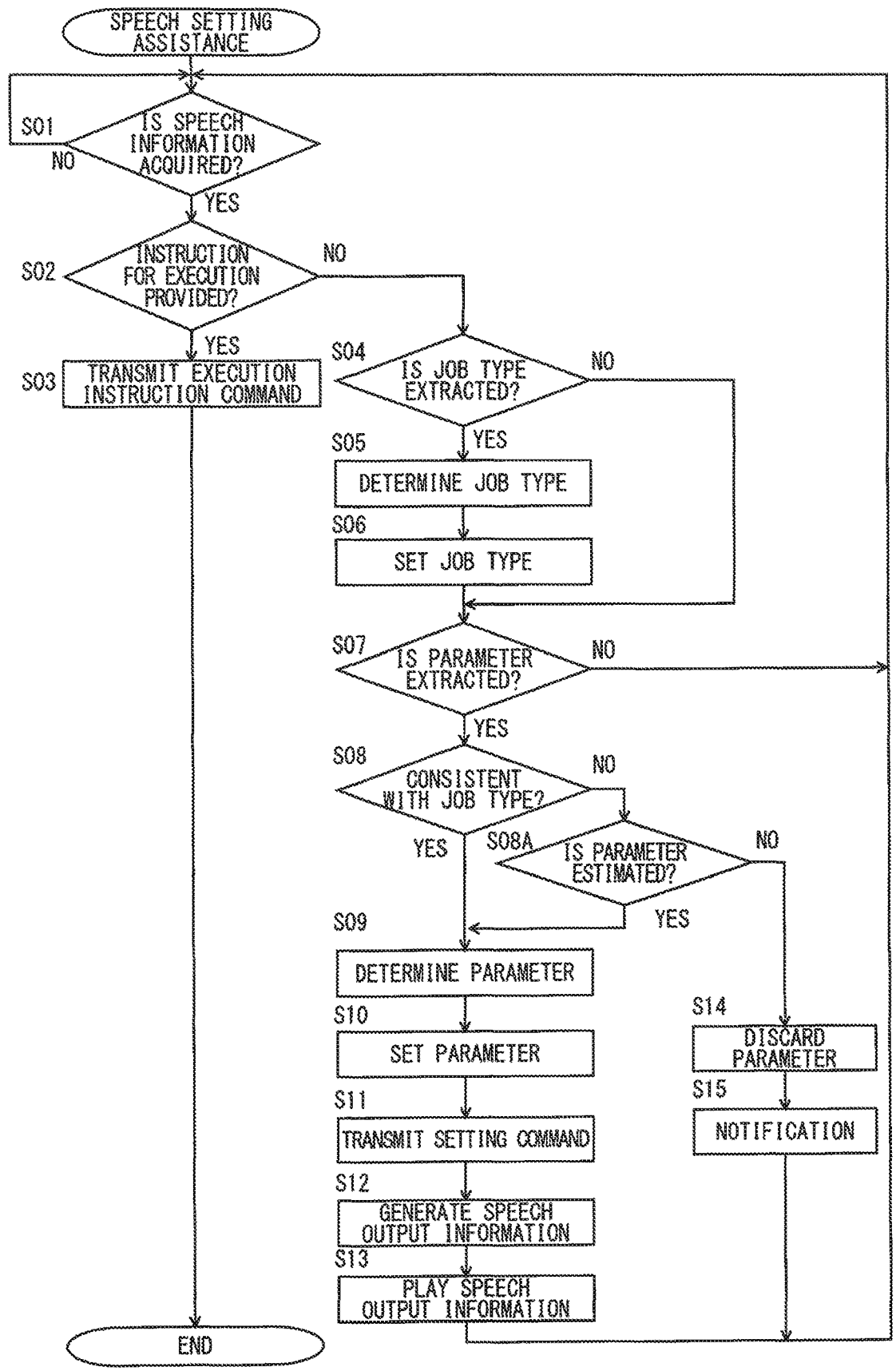
FIG. 13 is a flowchart showing one example of a flow of a device setting process in the first modified example.

FIG. 13 is a flowchart showing one example of a flow of a device setting process in the first modified example. A difference from the device setting process shown in FIG. 10 is that the step S08A is added after it is determined that a job type and a parameter are inconsistent with each other in the step S08. The other process is the same as the process shown in FIG. 10. Therefore, a description thereof will not be repeated.

In the case where the parameter is judged to be inconsistent with the job type in the step S08, the process proceeds to the step S08A. In the step S08A, the CPU 201 judges whether a new parameter is estimated based on the parameter that is judged to be inconsistent with the job type. If a new parameter is estimated, the process proceeds to the step S09. If not, the process proceeds to the step S14. In the case where the process proceeds from the step S08A, a new parameter estimated in the step 08A is determined in the step S09, and the process proceeds to the step S10. A determined parameter is set for a job in the step S10, a setting command is transmitted in the next step S11, and the process returns to the step S01.

The speech setting assistance server 200 in the first modified example estimates a new parameter that is consistent with the job type based on the parameter that is judged to be inconsistent with the job type, thereby being able to easily perform an operation of setting a job by speech.

SECOND MODIFIED EXAMPLE

In a speech setting system 1 in a second modified example, a speech setting assistance server 200 generates a job to be executed by the MFP 100 and transmits the job to the MFP 100. In this case, the speech setting assistance server 200 defines default values of a job that is executable in the MFP 100, and generates a job by updating the default values with a job type and a parameter extracted from speech information. It is not necessary for the speech setting assistance server 200 in the second modified example to transmit a setting command to the MFP 100.

The speech setting assistance server 200 in the second modified example generates the job based on the job type and the parameter, thereby being able to cause the MFP 100 to execute the job in accordance with the job type and the parameter.

THIRD MODIFIED EXAMPLE

In a speech setting system 1 in a third modified example, a speech setting assistance server 200 may have the function of the above-mentioned speech information generation server 300. Further, the MFP 100 may have the functions of the speech setting assistance server 200.

FOURTH MODIFIED EXAMPLE

In the speech setting system 1, the one MFP 100 is associated with the one smart speaker 400. In a speech setting system 1 in a fourth modified example, a plurality of devices to be controlled are associated with one smart speaker 400. Here, two MFPs 100, 100A are the devices to be controlled, by way of example. The devices to be controlled are distinguished from each other by the names provided to the respective MFPs 100, 100A. For example, the name of the MFP 100 is a first MFP, and the name of the MFP 100A is a second MFP. In this case, if the word 'FIRST MFP' is included in speech information, the speech setting assistance server 200 specifies the MFP 100 as a device to be controlled. If the word 'SECOND MFP' is included in the speech information, the speech setting assistance server 200 specifies the MFP 100A as a device to be controlled.

The MFPs 100, 100A may have different setting screens for a same job type. Therefore, in the fourth modified example, a setting confirming portion 273 acquires the output order from each of the MFPs 100, 100A. For example, a setting confirming portion 273 receives output order information including the output order from each of the MFPs 100, 100A.

FIG. 14 is a diagram showing one example of output order information. FIG. 14 shows the output order information acquired from the MFP 100A. Referring to FIG. 14, the output order information "MFP_12345" indicates that the transmission source of the output order information is the MFP 100A. The order in which "number," "combine," "duplex" and "color" are shown in the field for the output order information "read_order" indicates that the setting items are output in the order of 'NUMBER OF COPIES,' "TWO PAGES PER SHEET,' 'SCAN-PRINT' AND 'COLOR.'

Thus, even in the case where the MFPs 100, 100A have different setting screens for a same job type, a plurality of parameters can be output by speech in the order in which the plurality of parameters are arranged in the setting screen.

The setting confirming portion 273 may acquire arrangement information of the plurality of parameters arranged in the setting screen from each of the MFPs 100, 100A. The arrangement information represents the relative positional relationship among the plurality of parameters and represents the positional relationship in regard to the left-and-right direction and the top-and-bottom direction. The setting confirming portion 273 determines the output order based on the arrangement information.

Because the speech setting assistance server 200 in the fourth modified example receives the display order from each of the plurality of MFPs 100, 100A, even if the arrangement of the plurality of parameters are different in the setting screens of the plurality of MFPs 100, 100A, the parameters can be output by speech in the output order corresponding to each of the plurality of MFPs 100, 100A.

While the MFP 100 is one example of a job execution device in the present embodiment, the job execution device may be an information processing apparatus such as a computer that executes a job of defining data processing, for example, as long as being able to execute a job.

Although embodiments of the present invention have been described and illustrated in detail, the disclosed embodiments are made for purpose of illustration and example only and not limitation. The scope of the present invention should be interpreted by terms of the appended claims.

What is claimed is:

1. A speech setting system comprising:
a job execution device that is capable of executing a job; and
a speech setting assistance device that assists generation of the job to be executed by the job execution device based on speech information obtained from speech, wherein:
the job execution device includes a first hardware processor,
the first hardware processor is configured to:
execute the job in accordance with a parameter set for each of a plurality of setting items, and
display a setting screen in which a plurality of the parameters respectively corresponding to the plurality of setting items are arranged,
the speech setting assistance device includes a second hardware processor, and
the second hardware processor is configured to:
determine the parameter corresponding to each of the plurality of setting items based on the speech information, and
output speech output information for outputting the determined parameter corresponding to each of the plurality of setting items by speech in accordance with an output order that is defined based on a relative positional relationship among the plurality of the parameters arranged in the setting screen.

2. The speech setting system according to claim 1, wherein the second hardware processor, in a case in which one or more parameters respectively corresponding to one or more setting items among the plurality of setting items are determined, is configured to output the speech output information for outputting the one or more determined parameters by speech in accordance with the output order.

3. The speech setting system according to claim 1, wherein the second hardware processor is configured to cause a speech output device to output speech based on the speech output information.

4. The speech setting system according to claim 1, wherein the relative positional relationship among the plurality of the parameters arranged in the setting screen is predetermined.

5. The speech setting system according to claim 1, wherein the second hardware processor, in a case in which the relative positional relationship among the plurality of the parameters arranged in the setting screen is changed by the job execution device, is configured to output the speech output information for outputting the determined parameter corresponding to each of the plurality of setting items by speech in accordance with an output order that is defined based on the relative positional relationship among the plurality of the parameters arranged in the changed setting screen.

6. The speech setting system according to claim 1, wherein the output order is defined as an order in which the plurality of the parameters are arranged from left to right in a case in which the plurality of the parameters arranged in the setting screen are arranged in a horizontal direction of the setting screen, and the output order is defined as an order in which the plurality of the parameters are arranged from a top to a bottom of the setting screen in a case in which the plurality of the parameters are arranged in a vertical direction of the setting screen.

7. The speech setting system according to claim 1, wherein:
the job execution device comprises plural job execution devices, and
the second hardware processor is configured to receive the output order from each of a plurality of the job execution devices.

8. The speech setting system according to claim 1, wherein the job execution device comprises an image processing apparatus.

9. A non-transitory computer-readable recording medium having a speech setting assistance program stored thereon that is executable by a computer, the speech setting assistance program causing the computer to:
determine a plurality of parameters that are respectively set for a plurality of setting items based on speech information obtained from speech in order to cause a job execution device to execute a job in accordance with the plurality of set parameters respectively corresponding to the plurality of setting items, and
in a case in which the job execution device displays a setting screen in which the plurality of set parameters respectively corresponding to the plurality of setting items are arranged, output speech output information for outputting the determined parameters respectively corresponding to the plurality of setting items by speech in accordance with an output order that is defined based on a relative positional relationship among the plurality of parameters arranged in the setting screen.

10. The non-transitory computer-readable recording medium according to claim 9, wherein the speech setting assistance program, in a case in which one or more parameters respectively corresponding to one or more setting items among the plurality of setting items are determined, causes the computer to output the speech output information for outputting the one or more determined parameters by speech in accordance with the output order.

11. The non-transitory computer-readable recording medium according to claim 9, wherein the speech setting assistance program causes the computer to cause a speech output device to output speech based on the speech output information.

12. The non-transitory computer-readable recording medium according to claim 9, wherein the relative positional relationship among the plurality of parameters arranged in the setting screen is predetermined.

13. The non-transitory computer-readable recording medium according to claim 9, wherein the speech setting assistance program, in a case in which the relative positional relationship among the plurality of parameters arranged in the setting screen is changed by the job execution device, causes the computer to output the speech output information for outputting the determined parameters respectively corresponding to the plurality of setting items by speech in accordance with an output order that is defined based on the relative positional relationship among the plurality of parameters arranged in the changed setting screen.

14. The non-transitory computer-readable recording medium according to claim 9, wherein the output order is defined as an order in which the plurality of parameters are arranged from left to right in a case in which the plurality of parameters arranged in the setting screen are arranged in a horizontal direction of the setting screen, and the output order is defined as an order in which the plurality of parameters are arranged from a top to a bottom of the setting screen in a case in which the plurality of parameters are arranged in a vertical direction of the setting screen.

15. The non-transitory computer-readable recording medium according to claim 9, wherein:
the job execution device comprises plural job execution devices, and
the speech setting assistance program causes the computer to receive the output order from each of a plurality of the job execution devices.

16. The non-transitory computer-readable recording medium according to claim 9, wherein the job execution device comprises an image processing apparatus.

17. A speech setting assistance device comprising a hardware processor, the hardware processor being configured to:
determine a plurality of parameters that are respectively set for a plurality of setting items based on speech information obtained from speech in order to cause a job execution device to execute a job in accordance with the plurality of set parameters respectively corresponding to the plurality of setting items, and
in a case in which the job execution device displays a setting screen in which the plurality of set parameters respectively corresponding to the plurality of setting items are arranged, output speech output information for outputting the determined parameters respectively corresponding to the plurality of setting items by speech in accordance with an output order that is defined based on a relative positional relationship among the plurality of parameters arranged in the setting screen.

18. The speech setting assistance device according to claim 17, wherein the hardware processor, in a case in which one or more parameters respectively corresponding to one or more setting items among the plurality of setting items are determined, is configured to output the speech output information for outputting the one or more determined parameters by speech in accordance with the output order.

19. The speech setting assistance device according to claim 17, wherein the hardware processor is configured to cause a speech output device to output speech based on the speech output information.

20. The speech setting assistance device according to claim 17, wherein the relative positional relationship among the plurality of parameters arranged in the setting screen is predetermined.

21. The speech setting assistance device according to claim 17, wherein the hardware processor, in a case in which the relative positional relationship among the plurality of parameters arranged in the setting screen is changed by the job execution device, is configured to output the speech output information for outputting the determined parameters respectively corresponding to the plurality of setting items by speech in accordance with an output order that is defined based on the relative positional relationship among the plurality of parameters arranged in the changed setting screen.

22. The speech setting assistance device according to claim 17, wherein the output order is defined as an order in which the plurality of parameters are arranged from left to right in a case in which the plurality of parameters arranged in the setting screen are arranged in a horizontal direction of the setting screen, and the output order is defined as an order in which the plurality of parameters are arranged from a top to a bottom of the setting screen in a case in which the plurality of parameters are arranged in a vertical direction of the setting screen.

23. The speech setting assistance device according to claim 17, wherein:
the job execution device comprises plural job execution devices, and
the hardware processor is configured to receive the output order from each of a plurality of the job execution devices.

24. The speech setting assistance device according to claim 17, wherein the job execution device comprises an image processing apparatus.

* * * * *